July 17, 1951  W. D. FOSTER ET AL  2,560,564
FILM CONTAINING MAGAZINE AND FILM HANDLING APPARATUS
Filed Feb. 12, 1948  9 Sheets-Sheet 4
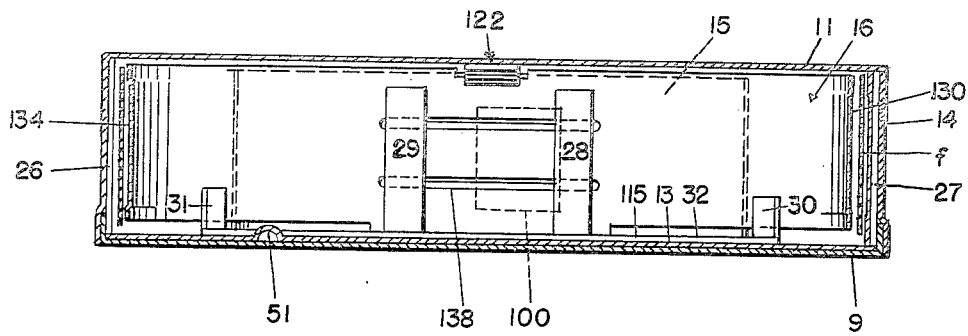
FIG. 10
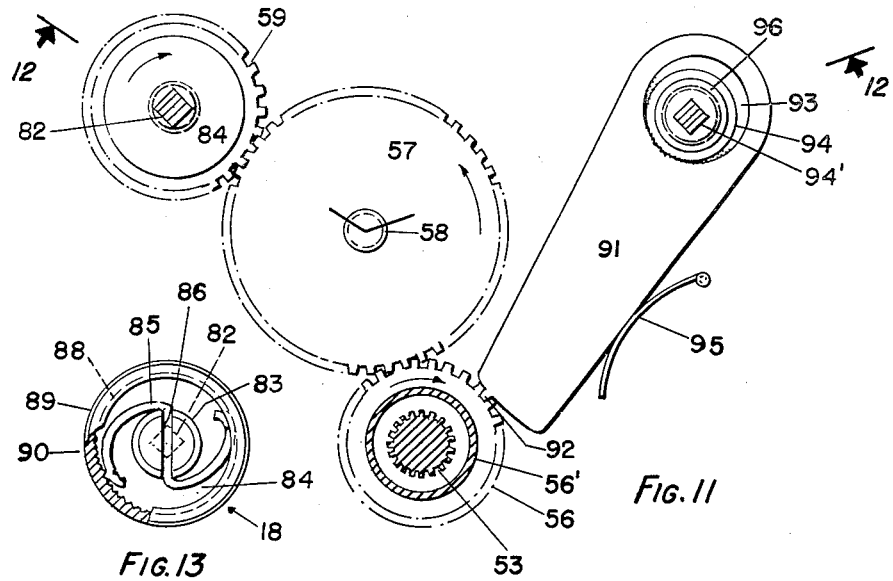
FIG. 11
FIG. 13
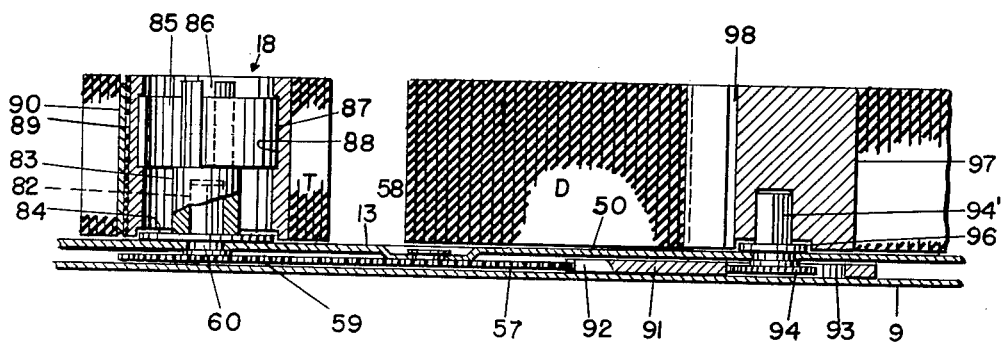
FIG. 12
INVENTORS
WARREN DUNHAM FOSTER
OLIVER WHITWELL WILSON
BY July 17, 1951 W. D. FOSTER ET AL 2,560,564
FILM CONTAINING MAGAZINE AND FILM HANDLING APPARATUS
Filed Feb. 12, 1948 9 Sheets-Sheet 5
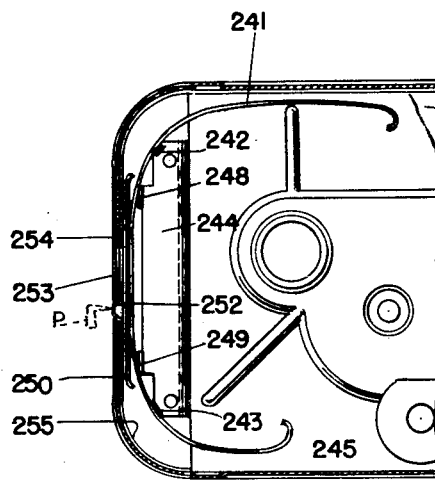
FIG.17
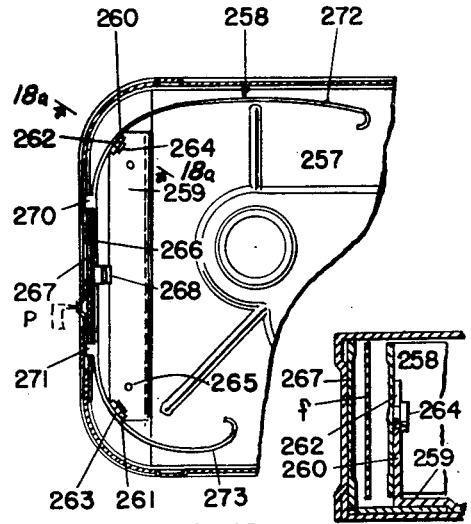
FIG.18   FIG.18a
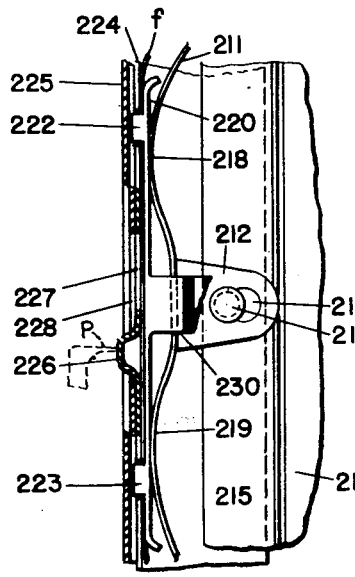
FIG.7b
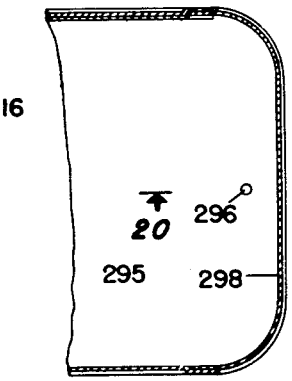
FIG.16   FIG.15   FIG.14
FIG.19
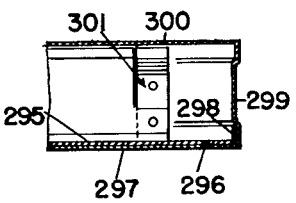
FIG.20
INVENTORS
WARREN DUNHAM FOSTER
OLIVER WHITWELL WILSON
BY
Warren Dunham Foster July 17, 1951  W. D. FOSTER ET AL  2,560,564
FILM CONTAINING MAGAZINE AND FILM HANDLING APPARATUS
Filed Feb. 12, 1948  9 Sheets-Sheet 6

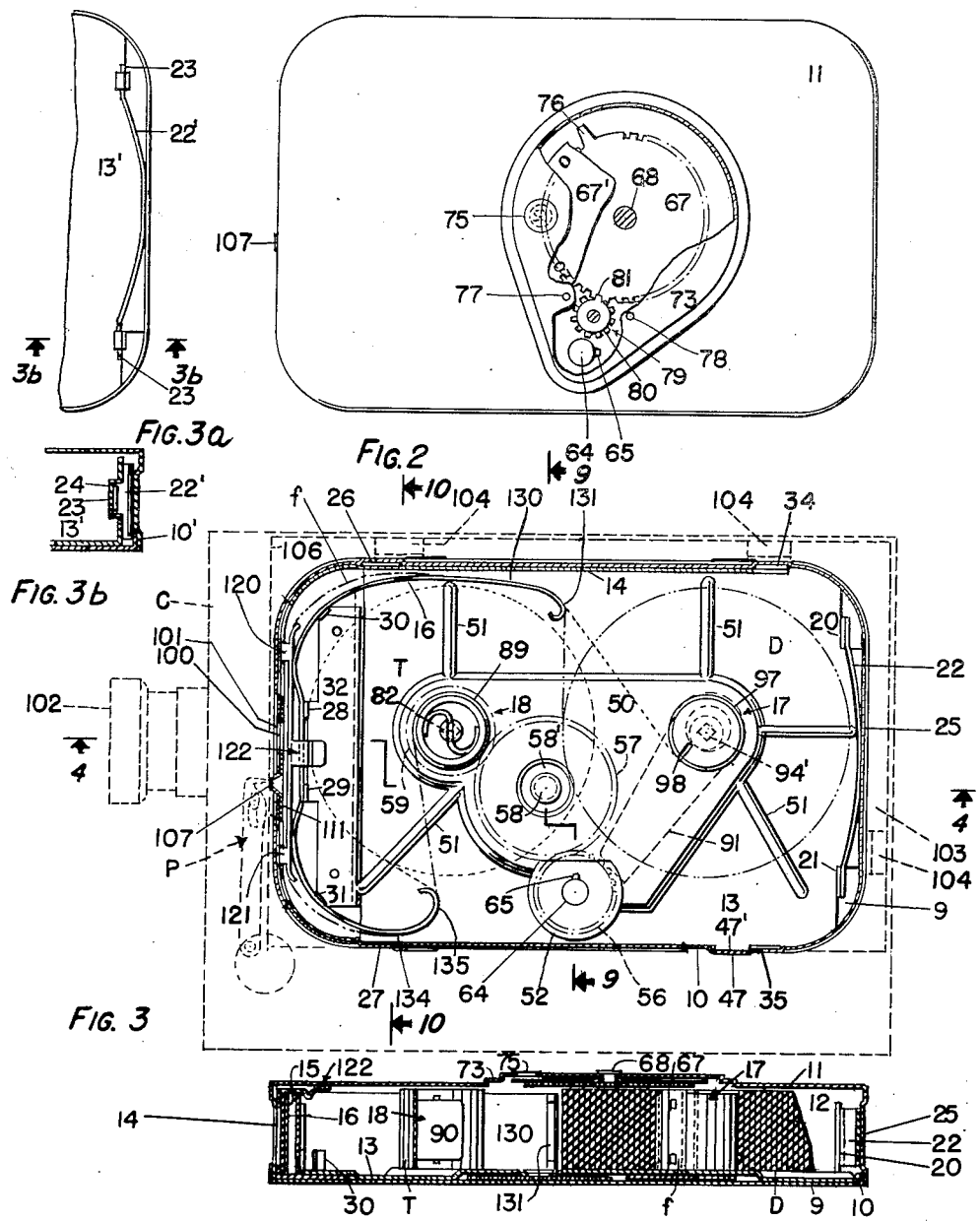

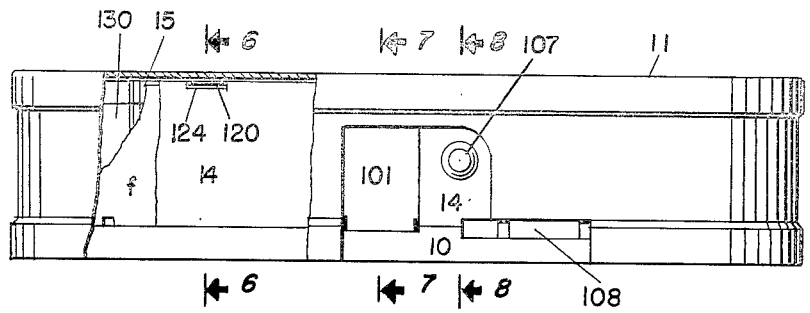
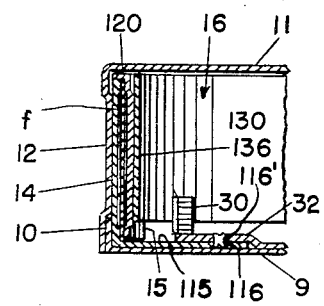
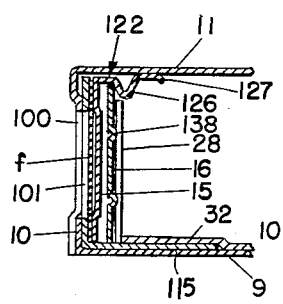
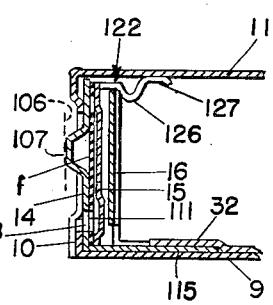
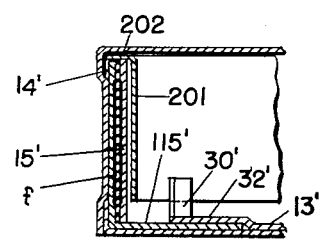
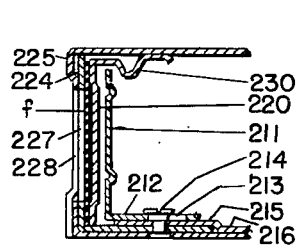
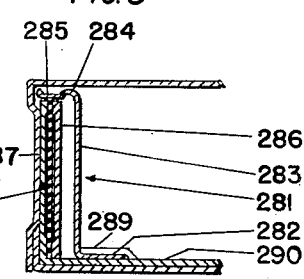
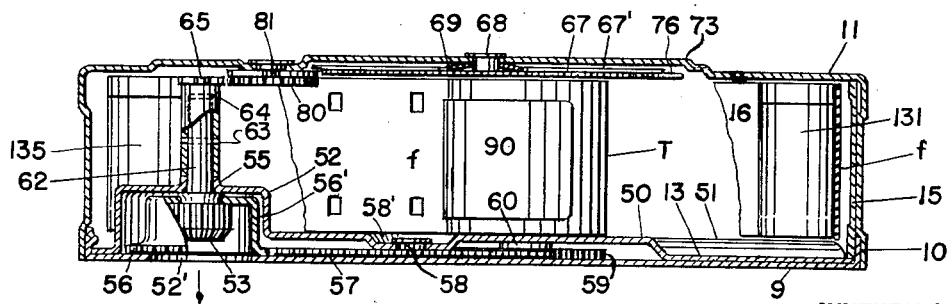

INVENTORS
WARREN DUNHAM FOSTER
OLIVER WHITWELL WILSON
BY
Warren Dunham Foster

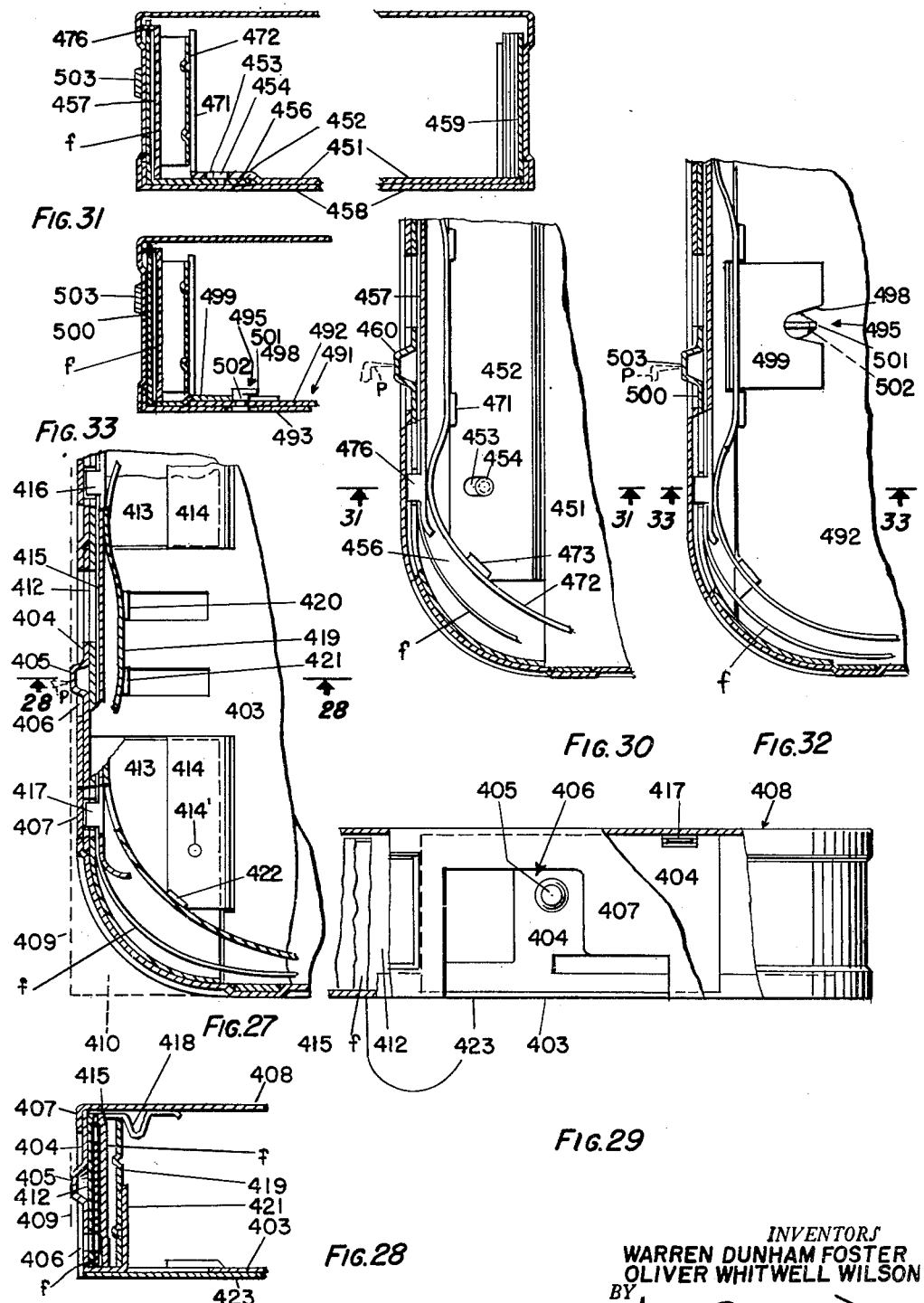

INVENTORS
WARREN DUNHAM FOSTER
OLIVER WHITWELL WILSON

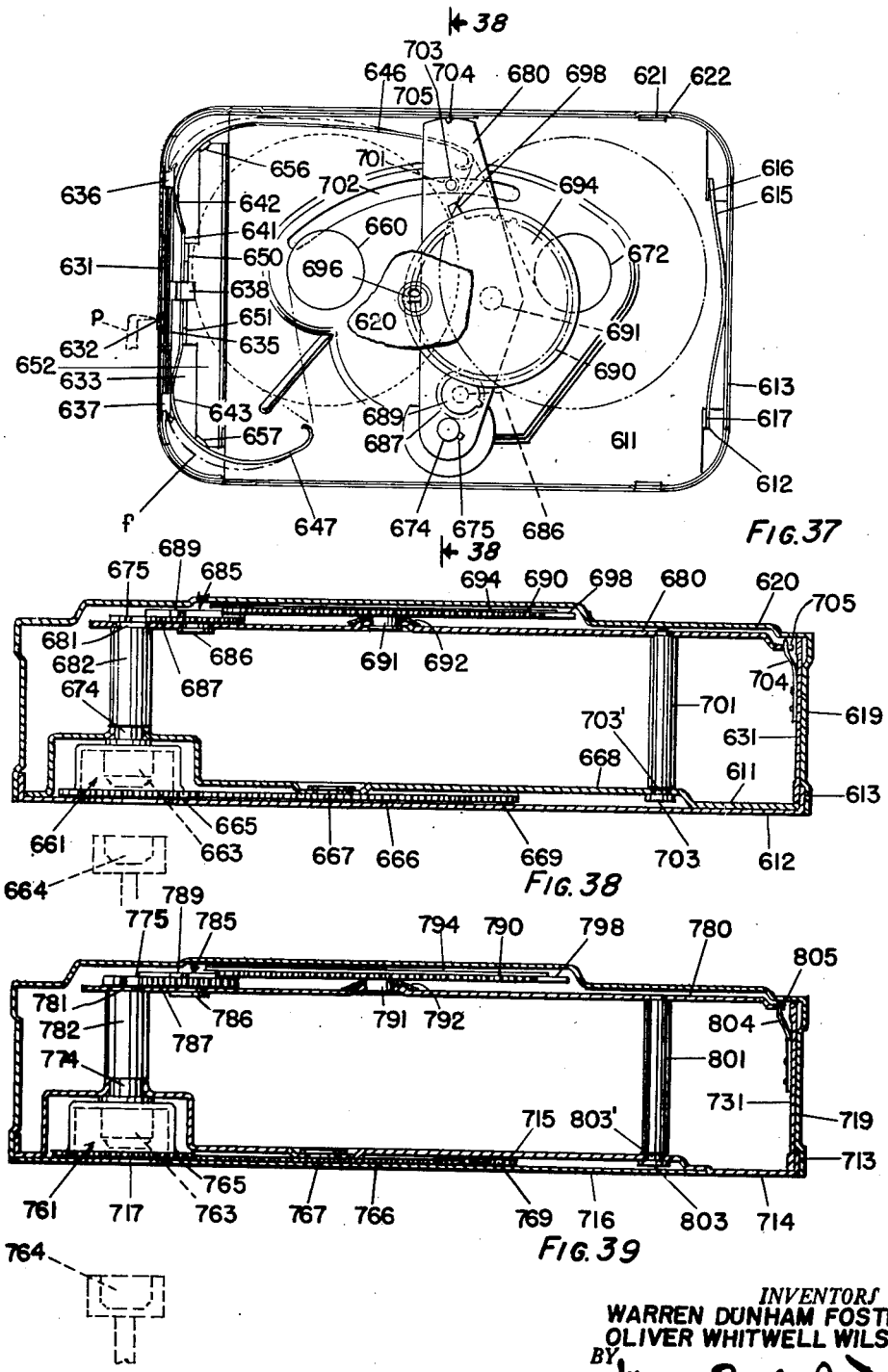

Patented July 17, 1951

2,560,564

UNITED STATES PATENT OFFICE 2,560,564

FILM CONTAINING MAGAZINE AND FILM HANDLING APPARATUS

Warren Dunham Foster, Eustis, Fla., and Oliver Whitwell Wilson, Yonkers, N. Y., assignors, by direct and mesne assignments, to Foster and Foster, Ridgewood, N. J., a co-partnership Application February 12, 1948, Serial No. 7,926

90 Claims. (Cl. 88—17)

Our invention may be applied to motion picture and other film handling and photographic apparatus for use by amateurs but its utility is not so limited. We are illustrating our invention in connection with a magazine containing film for use in a camera but in many of its phases our invention is applicable to any device for the projection or exposure or printing of pictures or of other images. Our invention as illustrated relates particularly to improved magazines for use with film handling apparatus of the type wherein a film carried by the magazine is pressed against an apertured plate contained within the magazine which determines the focal plane. In certain of its aspects, however, this invention may be applied to magazines of the type wherein the film carried by the magazine is brought into the focal plane of a lens of an apparatus and critically positioned and maintained therein solely by mechanism which is a part of the apparatus. Our invention includes an improved gate which is illustrated as embodied within a magazine but certain of the features of this gate may be employed in apparatus making use of open reels without a magazine.

One chief purpose of a film containing magazine is to make the threading of an apparatus with which a film is used simple, safe and quick and without trouble or requirement of skill. Also such a magazine for use with a camera must be so constructed that it can be easily loaded with film by a manufacturer before it is sent out and the film after exposure removed therefrom for processing. Also the film must be fed without danger of jamming or other difficulty and must be closely maintained in all planes in the exact wanted position so that images impressed thereupon or projected therefrom will be accurate and pleasing. Our invention has among its chief objects the provision of novel mechanism which accomplishes these results.

We are illustrating our inventions as applied to a magazine making use of the Bundick and Proctor tension control system of feeding as shown in United States Patent Number 1,944,022, and further developed for use in magazines by the senior applicant herein as evidenced by United States Patents Number 1,975,782, and by Kurt Morsbach et al. in Patents Numbers 2,159,998, 2,175,538 and others of the same groups. In these earlier patents showing magazines and those related thereto this highly efficient system of film feeding has been generally illustrated as applied to a magazine of the Ford type as shown in his United States Patents Numbers 1,944,023 and 2,175,538 and others of these groups wherein the film is positioned by the apparatus. Among the important objects of this invention is the provision of improved constructions by which the tension control system of feeding is efficiently applied to a magazine wherein the focal plane and other elements which position the film are in large part supplied by the magazine itself. It should be understood, however, that in many of their aspects the improvements presented hereby are equally applicable to a magazine of the Ford type and also to a magazine of the Thornton type wherein a continually operating sprocket is intended to maintain a loop of slack film, as illustrated for example in such patents of John Edward Thornton as British Number 164,467 accepted June 6, 1921, or United States 1,716,990, June 11, 1929, or such patents as that to Wittel 2,043,914, dated June 9, 1936.

According to one preferred embodiment of this invention we prefer to mount the various elements of the magazine upon a relatively heavy and stiff chassis plate which is disposed within a relatively light enclosing housing. Such construction need increase no over-all dimensions of the magazine for the extra width necessitated by the chassis plate is made up by the decreased thickness of the housing itself. Magazines designed in accordance herewith have no greater dimensions than conventional magazines and may be used interchangeably therewith. In such embodiments all or a large part of the operating and film moving and film contacting elements of the magazine are supported by this plate and the enclosing housing serves merely as a protective cover. The chassis and parts supported thereby may be of metal and the housing of a plastic. The chassis is disposed parallel to and adjacent a bottom wall (later defined) of our magazine. In an embodiment of the invention which we much prefer this plate is positioned by a spring which is attached to the rear of the plate and bears against the inner surface of the rear of the magazine housing. Thus when the chassis is placed within the casing the film and all or practically all of the magazine parts are forced forwardly until a stop formed upon or attached to the chassis member limits such movement. One of the chief problems in construction of magazines of this kind is accurately to position a film within the focal plane, and to hold it therein during a feeding operation. In this embodiment of this invention as a spring bearing against the inside of a rear wall of the magazine moves a chassis plate forwardly the focal plane is determined by the coaction of a locating lug integral with or attached to and movable with this chassis and an accurately formed surface disposed upon the apparatus. The gate, which holds the film in the focal plane, is fixed to the chassis. It will be understood of course by those skilled in this art that this relative movement between chassis and outer container is very slight but it is highly important. An important object of this invention therefore is the provision within a magazine of novel and improved means for accurately locating a film within the focal plane. In another embodiment of this phase of our invention the chassis plate may be rigidly attached to a portion of the magazine and the lug ground so that the gate of that particular magazine will be disposed exactly in the focal plane. In certain of its aspects this last mentioned phase of our invention is an improvement over that patented by the senior applicant hereof March 31, 1942, as Number 2,277,695. In that patent, however, the chassis is rigidly fixed to an outer container.

Alternatively to the above construction we may mount the gate and other film guiding members and the film supporting members upon the chassis and the drive upon the bottom plate. Thus all parts of the magazine which cooperate to establish the focal plane are upon the chassis while the drive is upon the bottom. A member connected to a take-up support extends therefrom to the side of the chassis adjacent the bottom where it is engaged by a driving member mounted on the bottom. Assembly is often thus made easier. If the chassis is spring pressed the relative movement between the chassis and the bottom is insufficient to disturb the drive but sufficient to place the film in the focal plane. Novel light trapping arrangements are provided which are particularly applicable to this feature of our invention.

It has been conventional to construct a magazine of two housings which for convenience may be called a bottom and a top. Heretofore, so far as known to us, the bottom has been made with relatively high sides or edge walls and the top either with sides or edge walls which depend a considerable distance or with sides or edge walls which was short. Thus the operative and other parts of the magazine must be mounted within a box with relatively high side walls, and a film threaded therein. We prefer to form our magazine with a bottom member with very low sides or flanges upon which are mounted either directly or by a chassis plate all or a large part of the film contacting and film moving elements of the magazine. These sides preferably are high enough merely to form a light seal and one member of a latch which holds parts of the magazine together. We place all or a large part of the operable parts either upon the chassis or upon the bottom if we use no chassis plate. According to this arrangement the parts upon which the film must be threaded are easily accessible. Thus time of assembly, threading of the film, its removal and servicing and likelihood of mistake are much reduced. These savings are very great. This construction should not be confused with one wherein operable parts are mounted between two relatively heavy plates and the whole mounted within a box to which certain parts are attached. Such an arrangement defeats the easy accessibility, simplicity of a servicing and quick assembly which characterize our invention.

In preferred forms of the invention we supply novel devices such as latching lugs upstanding from the bottom member for locking either the chassis plate to the bottom and top housings and those housings to each other or if no chassis plate is employed for locking these housing members to each other. Preferably these latches are so constructed that it is impossible to operate them except by the use of special tools. This arrangement prevents unauthorized and inexperienced persons from tampering with the film and its mechanism and from fogging the film. We also supply novel means for detachably connecting a chassis plate and the adjacent side of a container. An important object of this invention, therefore, is the provision of novel and improved construction of the static parts of a magazine—those which support and protect the film contacting and film moving elements.

Also included in our invention is an improved fixed apertured gate member including a locating lug formed integrally therewith and extending forwardly and freely through an appropriate opening in the front housing of the magazine in order to contact a cooperating locating point on the camera and thus determine the focal plane. Thus construction is alternative to the formation of this locating point upon the chassis member. Either construction exactly determines the focal plane. Preferably also we include in this fixed gate member a rearwardly offset portion at its bottom which serves both as a bottom edge guide for the film and as a locking element by which this gate plate is mounted upon the chassis member or upon the bottom of the magazine if such construction is used. Among the important objects of this invention is the provision of novel and improved devices for mounting gate members upon a magazine or in any film handling apparatus.

Also included in the objects of this invention is other improved gate structure, including a presser member having top edge guides struck therein and turned forwardly or toward the lens. Such edge guides and in fact the entire gate structure is made more simple and efficient by a novel element in the form of a finger and locking formation which is either attached to or formed with the top of the presser member and extends backwardly away from the lens and slightly upwardly into contact with the top of a magazine. This member serves both as a finger hold by means of which the presser member may be moved backwardly away from the film and as a positioning member bearing against the top of the magazine to hold the presser member and the film from lateral movement.

Instead of the edge guide noted above, we may provide such a device in the forms of simple leaf springs extending upwardly from the bottom of a magazine or a chassis plate and then offset forwardly at a right angle to bear upon the top of this film as it passes through the gate.

A most important feature of our invention is provision of novel gate structure for a film magazine or for any film handling apparatus. Although many of our novel elements and combinations are particularly applicable to use in a magazine they are not limited to such use.

Another characteristic of our gate structure is an improved single long multi-purposed gate spring which serves both to condition the feeding of the film in accordance with the Bundick and Proctor tension control system and also to give the necessary resilience to the presser member. This structure is an improvement over that of the Bundick et al. Patent Number 2,036,918. This spring may be formed with two curves pressing against the back of the presser member and as a whole loosely held by posts extending upwardly from the chassis member. Alternatively it may be formed with an arc which is established by fixedly attaching it to upright posts at spaced points representing the chord of the arc. When the presser member is placed between this arc and the fixed apertured gate section the arc is flattened to its chord and the necessary resilience furnished. According to this construction the pressure is applied to the gate in a single line as is often preferable. In either embodiment it preferably includes a positioning portion offset or attached at right angles and disposed parallel to and adjacent the positioning portion of the fixed apertured gate plate.

In a preferred embodiment of an invention we provide edge guides for the film in the form of a lug offset at a right angle forwardly from the main body of this multi-purposed spring and so disposed as to bear upon the upper edge of the film as it passes through the gate. These lugs may be formed integrally with the single spring or may be attached thereto. In either case construction, assembly and use are much simplified.

Among the objects of this invention is the provision of a plurality of novel and effective devices for attaching a fixed gate plate to a chassis or to a bottom plate of a magazine or a support in a film handling apparatus. Use of these devices saves time and expense in manufacture, assembly and servicing. Certain of these devices are particularly adapted to cooperate with our spring mounting of our chassis while others conserve certain of the advantages of such mounting when a rigid connection is substituted or the chassis eliminated.

In this specification and the attached drawings our invention is illustrated by a gate in which the fixed member is apertured and the presser member solid. It will of course be understood that the presser plate may be apertured and the fixed plate without an opening. Or, for projector use, as with a prism, or mirror, both may be apertured.

As is known to those skilled in the magazine art it is highly desirable that the film be prevented from unwinding because of its natural elasticity or other cause. It is therefore desirable to lock the delivery mass of the film against movement in either direction and the take-up mass especially against unwinding movement. Among the objects of this invention is the provision of simple, novel and improved means for reaching this end.

It is also essential that the take-up mass of the film be rotated by a yielding drive. We supply a simple and novel device which accomplishes this result.

Any user of a film within a magazine should know how much film has been fed or remains to be fed. It is preferable to supply such a footage recording device or meter upon the magazine and to make it visible through a wall in the camera with which the magazine is to be used. Therefore we provide a novel meter which is driven positively by one of the gears which drives the take-up mass. The part of the meter which shows the footage which has been used or remains to be used conventionally is mounted upon the cover of the magazine. We may so mount this indicator and drive it in such novel manner. Even so, the drive is so arranged that when the two magazine housings are placed in assembled relation connection between the driving and driven portion of the meter is automatically effectuated. No tools need be used or adjustments made. Alternatively we may mount the recording device upon an upward extension of the chassis so that literally speaking all of the moving and film contacting parts of the magazine are disposed upon this one member. This arrangement much simplifies assembly and servicing. The recording portion of the meter is mounted upon a swinging strap or bridge which also serves adequately as an edge guide for the film. In another embodiment of this phase of our invention this bridging structure is mounted directly upon the bottom plate. The provision of such a meter forms a very important object of this invention.

Among the important objects of this invention is the provision of novel, improved, simplified and cheapened construction of means for guiding, locating, moving, controlling and protecting a film within a magazine or otherwise.

The objects of this invention will be clear from the above generalized portion of this specification, the detailed description which follows, the subjoined claims and the accompanying drawings. Other objects, advantages and characteristics also will be so evident. Although we are showing only preferred forms of our invention for the purpose of illustration it will be understood that changes can readily be made without departing from the scope of our broader claims or the spirit of our invention.

In the drawings:

Figure 2 (Sheet 2) is a top plan view of the magazine of Figure 1, with its cover partly broken away to show a preferred form of meter.

Figure 3 is a top plan view of the magazine of Figure 2 with its cover removed in position in a magazine-receiving compartment of a camera.

Figure 3a is a fragmentary top plan view of a portion of the subject matter of Figure 3 and showing a different means for mounting a chassis spring.

Figure 3b is a section taken on the line 3b—3b of Figure 3a and looking in the direction of the arrows.

Figure 4 is a section on line 4—4 of Figure 3 looking in the direction of the arrows.

Figure 5 (Sheet 3) is an enlarged elevation of the front end of the magazine of Figure 1 partially broken away to indicate parts of a gate structure, positioning lug and a delivery tensioning spring.

Figure 6 is a section taken on the line 6—6 of Figure 5 and looking in the direction of the arrows.

Figure 6a corresponds to Figure 6 but is a variant wherein the top edge guide is formed as a part of a resilient multi-purposed gate and tensioning member.

Figure 7 is a section taken on the line 7—7 of Figure 5 and looking in the direction of the arrows.

Figure 7a corresponds to Figure 7 but is a variant wherein the resilient member is held by a bayonet and key on the bottom or cross member of the apertured gate plate.

Figure 7b (Sheet 5) is an enlarged top plan view partly in section of the structure of Figure 7a.

Figure 8 (Sheet 3) is a section on the line 8—8 of Figure 5 and looking in the direction of the arrows.

Figure 8a is a section which generally corresponds to Figure 8 but shows an embodiment of our invention wherein an edge guide is supported by a bottom member of a magazine housing.

Figure 9 is an enlarged section on the line 9—9 of Figure 3 and looking in the direction of the arrows with certain parts broken away and particularly showing certain parts of a drive for a take-up and a footage-counting device.

Figure 10 (Sheet 4) is a section taken on the line 10—10 of Figure 3 and looking in the direction of the arrows.

Figure 11 is an enlarged fragmentary top plan view of the drive for the take-up and our novel compound unidirectional clutch and blocking member.

Figure 12 is an enlarged section taken on the irregular line 12—12 of Figure 11 and looking in the direction of the arrows.

Figure 13 is an enlarged horizontal section of an improved and novel take-up clutch or drive.

Figures 14, 15 and 16 (Sheet 5) are enlarged sectional views showing our latching means and, their operation and tools necessary therefor. Figure 14 shows the magazine housings in their latched condition and Figure 15 as the process of separation has just begun and Figure 16 shortly thereafter.

Figure 17 is a top plan view of a prefered embodiment wherein resilience for a presser member is furnished by flattening an arc of a multi-purposed spring into a chord while it is fixed at the extremity of said arc.

Figure 18 is a top plan view generally corresponding to that of Figure 17 of another preferred embodiment of our invention wherein a multi-purposed gate and compensating spring is mounted by a bayonet and slot connection on two upstanding posts of a forward part of a chassis plate.

Figure 18a is an enlarged section taken on the line 18a—18a of Figure 18 and looking in the direction of the arrows.

Figure 19 is a top plan view of a variant of our invention wherein the chassis is fixedly attached to the bottom of a magazine.

Figure 20 is a section on the line 20—20 of Figure 19 and looking in the direction of the arrow.

Figure 21:
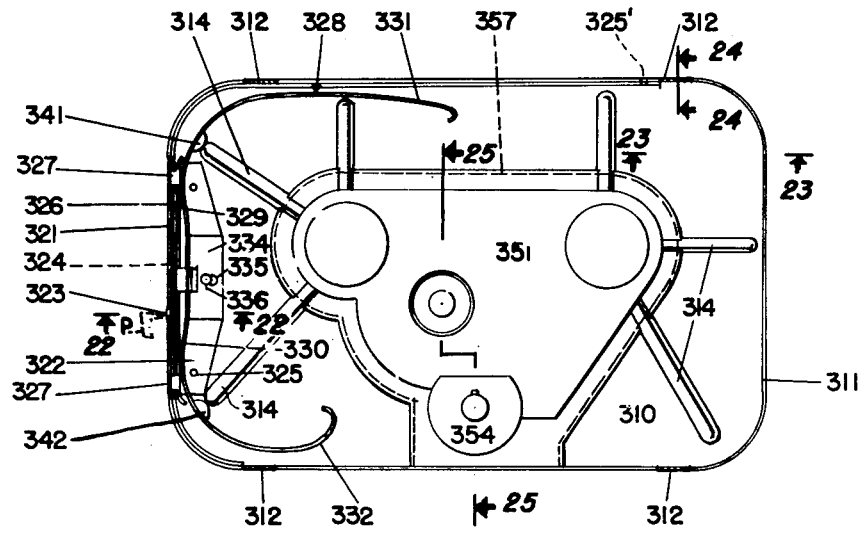

Figure 21 (Sheet 6) is a top plan view of a magazine wherein all members except the indicating portion of the footage counter are mounted directly on the bottom of the magazine, a chassis being omitted. An apertured front gate member is mounted fixedly to the bottom housing and embodies a positioning lug. A long double-purposed resilient member by a bayonet and slot connection is mounted on a back-turned portion of this apertured member.

Figures 22, 23, 26:
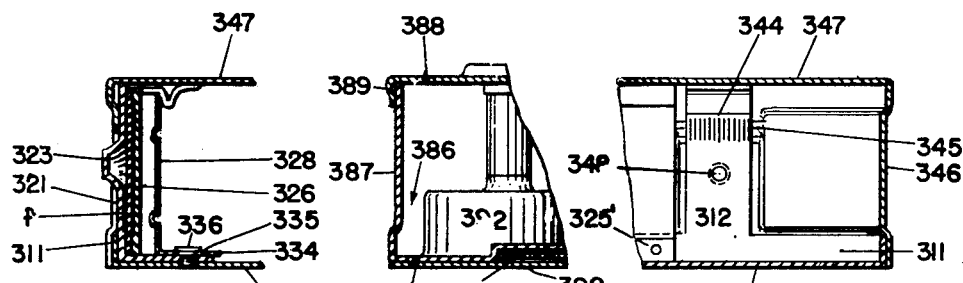

Figure 22 is an enlarged section taken on the line 22—22 of Figure 21 and looking in the direction of the arrows.

Figure 23 is an enlarged section on the line 23—23 of Figure 21 and looking in the direction of the arrows.

Figures 24, 25:
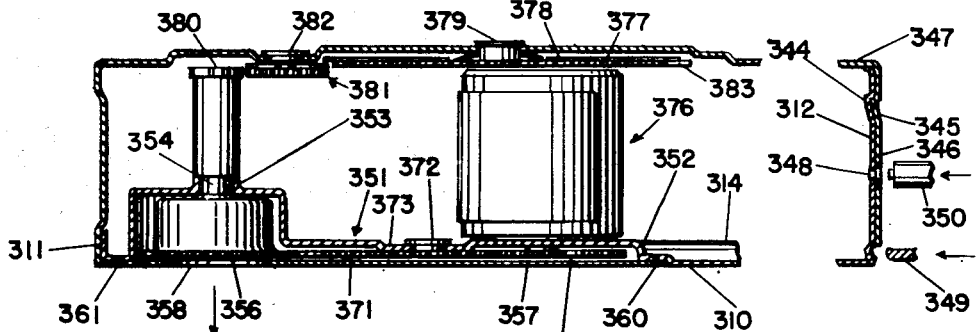

Figure 24 is an enlarged section on the line 24—24 of Figure 21 and looking in the direction of the arrows.

Figure 25 is an enlarged section on the line 25—25 of Figure 21 and looking in the direction of the arrows.

Figure 26 is an enlarged section showing a variant of the invention wherein a bottom housing of a magazine includes high sides.

Figure 27 (Sheet 7) is a top plan view of a most important variant of our invention wherein a positioning lug is formed upon a chassis plate rather than upon the front apertured member.

Figure 28 is a section taken on the line 28—28 of Figure 27 looking in the direction of the arrows and generally corresponding to Figure 8.

Figure 29 is a front elevation of a magazine of the type of Figures 27 and 28 and generally corresponds to Figure 5, certain parts being broken away.

Figure 30 is a top plan view showing a bayonet and slot connection whereby a fixed apertured gate section is attached to a chassis, or if desired directly to a magazine.

Figure 31 is a sectional view taken on the line 31—31 of Figure 30, certain parts being added, and looking in the direction of the arrows.

Figure 32 is a top plan view of another embodiment of this phase of our invention. It corresponds to Figure 30 and shows a rigid but detachable camming connection for fixing an apertured gate plate to a magazine.

Figure 33 is a section taken on the line 33—33 of Figure 32 and looking in the direction of the arrows.

Figure 34:
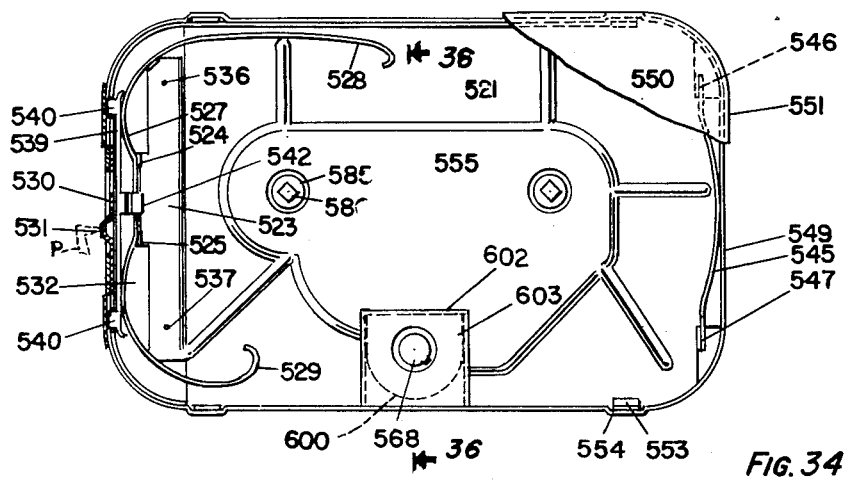
Figure 35:
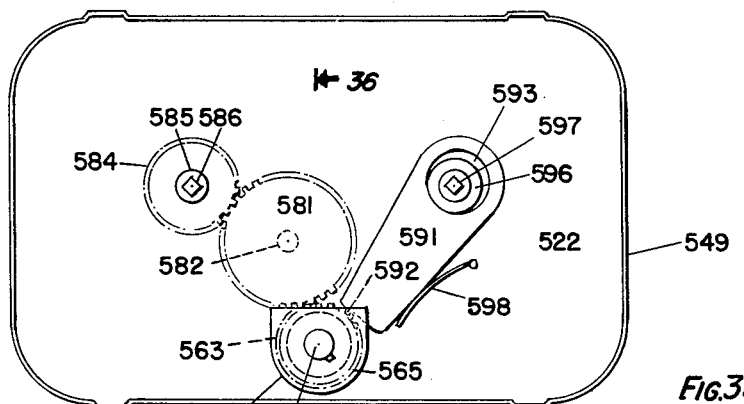
Figure 36:
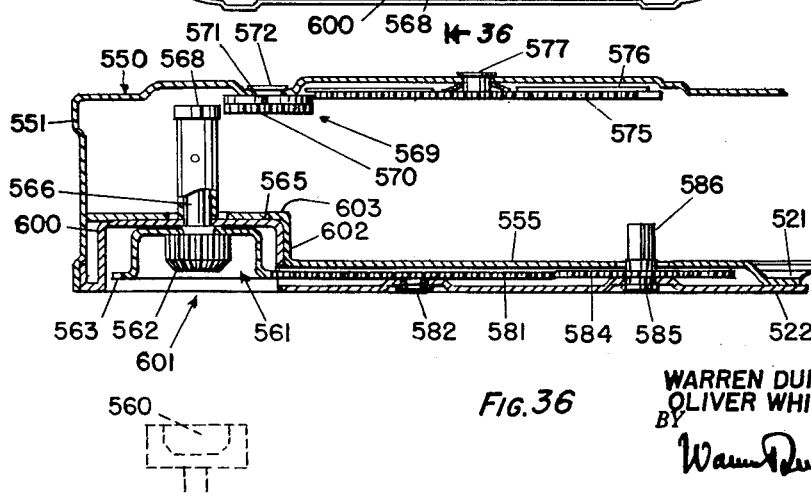

Figures 34, 35 and 36 which appear on Sheet 8 illustrate a most important embodiment of our invention wherein film-guiding and film-tensioning members are mounted upon a chassis plate while film moving members are mounted upon a bottom plate of a magazine.

Figure 34 is a top plan view generally corresponding to Figures 3, 17, 18, 21, 27, 30 and 32 and 37. It shows a chassis of this form of our invention mounted upon a bottom plate with the cover removed. For clarity gears and other members which appear below the chassis plate are not shown in dotted line.

Figure 35 is a top plan view of this embodiment of our invention showing a bottom plate alone.

Figure 36 is an enlarged section taken on the lines 36—36 of Figures 34 and 35 and looking in the direction of the arrows.

Figures 37, 38 and 39 which appear upon Sheet 9 show a form of our invention wherein all parts of a meter or footage-recording device are mounted upon either a chassis plate or the bottom of the magazine thereby very much simplifying the initial assembly, loading and unloading of the magazine, its servicing and its assembly after servicing. Figures 37 and 38 show all these parts mounted upon a chassis member and Figure 39 shows them positioned upon a bottom plate of a magazine.

Figure 37 is a top plan view of the structure described immediately hereinabove taken below the cover and above the chassis plate. In this figure all operative parts are mounted upon a chassis plate.

Figure 38 is an enlarged section taken on the line 38—38 of Figure 37 and looking in the direction of the arrows.

Figure 39 is a section corresponding to Figure 38 but showing all operative parts of a film-metering device supported by a bottom member of a film magazine.

For convenience in this specification and in the subjoined claims we are using the word "front"

as applied to that portion of a magazine or other structure which is relatively adjacent a lens when the magazine is within a film-handling apparatus and "rear" and the like to designate those portions relatively distant therefrom. We use the word "bottom" to indicate the part of the magazine which supports the contents (or is adjacent a chassis plate which does so) and "lower" and those related thereto to designate those portions of the magazine relatively adjacent the bottom. Such words as "top" and "upper" indicate the opposite portion. This terminology follows the drawings. As a magazine is in position in common types of film-handling apparatus, the "bottom" and "top" of the magazine in reality form the sides since they are held in a vertical position. As is common in the use of such words in relation to containers the upper or cover part is that which over-hangs and is removed from the bottom part to which the contents are fixed.

As will best be seen from an examination of Figures 1 to 13 we may prefer to embody our invention in the form of an outer protective container or casing generally rectangular in cross section which is composed essentially of a bottom housing 9 having low side or edge walls or rims or flanges 10, a top or cover housing 11 having relatively deep depending side walls 12, and a chassis member or plate 13 which is disposed between said housings and is completely encompassed and supported thereby. Thus the narrower side walls (or side walls and flanges) maintain the broader or wider top and bottom walls in spaced parallelism. The chassis plate is disposed adjacent the bottom of the magazine and may be only slightly less in cross section. In the form of our invention shown in those figures all operative parts of the magazine except the footage-recording device are supported upon this chassis. The most important of these members are a fixed apertured gate plate generally indicated as 14, a resiliently movable presser member 15, to hold a film thereagainst, a multi-purposed curved resilient member generally indicated as 16, which serves both as a compensating device and gives resilience to the presser member, a delivery support generally indicated as 17, and a take-up hub generally indicated as 18. Gearing and a meter or footage counter which are later identified and described are also supported upon this chassis.

In view of its central position and importance the chassis plate 13 will first be described. It consists essentially of a single stiff, relatively heavy stamping or the like containing various supporting and positioning lugs and other formations upturned from its broad surface. It is shown as solid, but to save weight certain parts may be cut away. These formations include two rear posts 20 and 21 to which a spring 22 is attached either by rivets or spot welding. Alternatively as shown in Figures 3a and 3b a spring 22' may be formed with ends narrowed as at 23 to fit within a laterally offset groove 24 (Figure 3b) formed in rearward posts 20' and 21' which are bent upwardly from the back edge of a chassis plate 13'. To assemble this embodiment of our invention a worker merely slips the spring and the chassis into place and the assembly is complete. In the forms of the invention shown in Figure 3, as well as in Figure 1, this spring presses firmly against a rear wall 25 of the top housing 11 thus tending to force the chassis plate and all parts supported thereby forwardly or to the left as seen in the drawings. In the form of our invention shown in Figure 3b however the spring bears against a rear wall or rim 10' of the bottom housing as well as the back wall of the cover. This construction makes easier the assembly of the free spring and tends also to align the two housings.

This chassis plate also includes upturned front side posts 26 and 27 which with other formations later described support and stiffen the sides of both housings thereby making practical the use of much lighter metal than otherwise would be the case or the employment of a plastic protective member. Support at the rear and front and further support at the sides are furnished by other upturned formations later described. Likewise struck upwardly from this one chassis plate are front gate posts 28 and 29 which serve as supports for the long double-purposed resilient member 16. Smaller upstanding posts 30 and 31 are employed to limit the inward movement of the tensioning portions (later described) of the multi-purposed spring. All four of these lugs last above mentioned are struck upwardly from a front portion 32 of the chassis plate which is slightly offset or raised in order to slip over a lower and rearward portion of the fixed apertured plate 14 later described in detail. This offset portion therefore is parallel to and adjacent the plane of the main broad surface of the chassis.

This central chassis also carries toward its rear edge two or more upstanding latching and reinforcing lugs 34 and 35 having delatching buttons 36 and 37 respectively and latching shoulders or projections 38 and 39, the operation of which will be clear from Figures 14, 15 and 16 (Sheet 5). Openings 38' and 39' are provided in the depending sides of the top into which these buttons fit and through which they may be operated by the tools later described. As will be seen in these figures the projections coact with shoulders or catch formations 40 and 41 formed in the depending sides 14 of the top cover member 11. In order to prevent accidental or unauthorized opening of the housing outside of the plant of the manufacturer which furnished the films this latching arrangement is such that it can be operated only by the use of special tools.

To open the housing a workman at the film plant sets a magazine in a special jig of which only the essential parts are shown provided with holding jaws 42 and 43 and unlatching tools 44 and 45 having projecting points or pins 46 and 47. He first moves all members inwardly toward the magazine. Jaws 42 and 43 grip the bottom of the magazine and unlatching members 44 and 45 press points 46 and 47 inwardly through openings 38' and 39' into contact with delatching buttons 36 and 37 thereby disengaging latch formations 38 and 39 respectively from catch formations 40 and 41 respectively and buttons 36 and 37 from engagement with openings 38' and 39' in sides of the cover of the magazine. The jig then causes relative movement between jaw 42 and tools 44 and jaw 43 and member 45 and disengages the cover from the body of magazine. It will of course be understood that in the case of a light-sensitive film this operation will be carried out only in a dark room. After an exposed film has been taken from the magazine and a new one is inserted the cover will be merely slipped in place and as it moves downwardly will cam latching posts 34 and 35 toward each other as shown in Figure 14 until the shoulders and latching projections interlock and buttons 36 and 37 slip into openings 38' and 39'.

Figure 1:
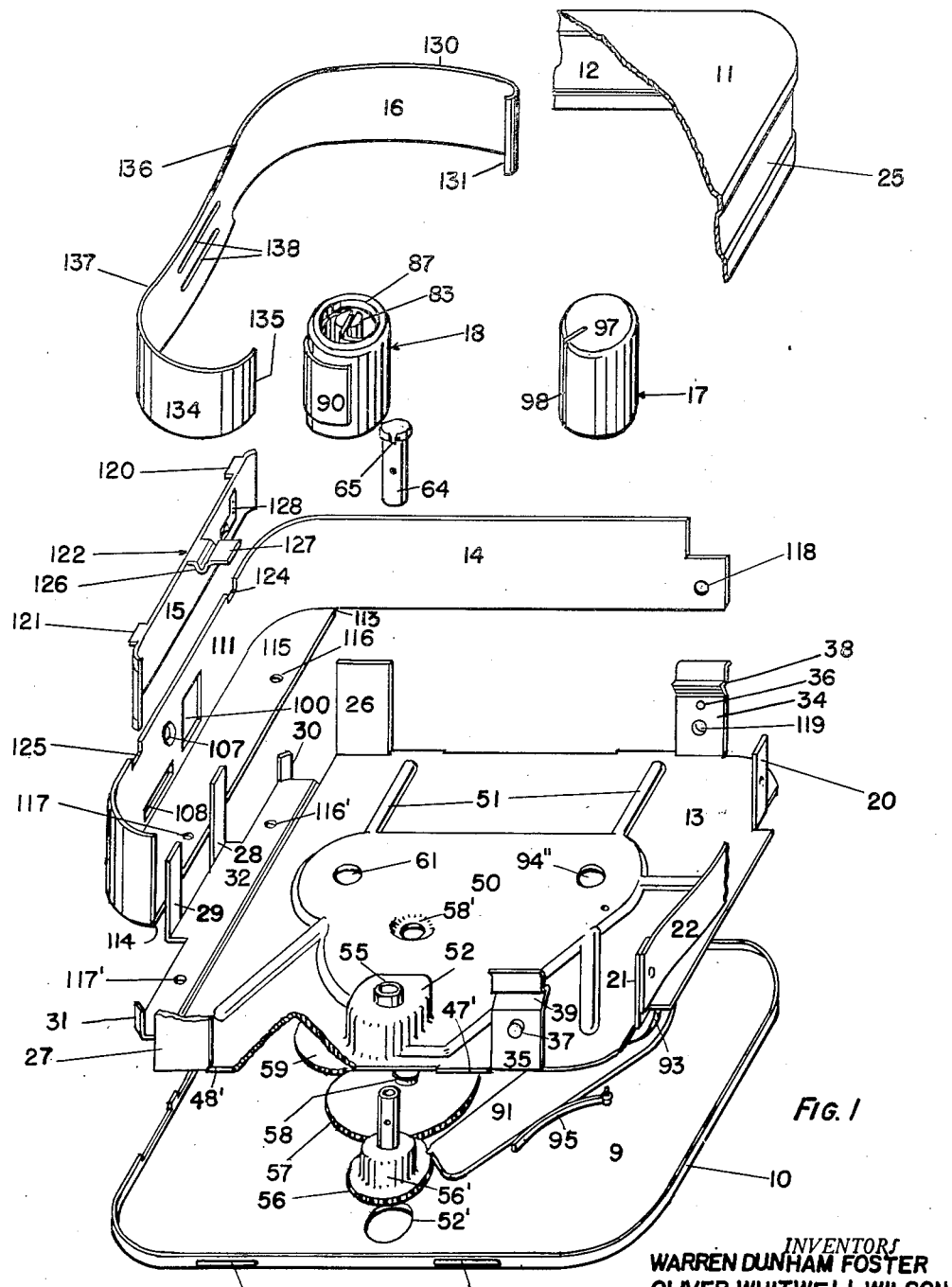
Figure 1 is an exploded isometric view of a magazine built according to a preferred form of of our invention, substantially complete except for a portion of a footage recording device. In this form a spring-pressed chassis is supported upon a low-sided or flanged bottom member of a magazine and a positioning lug is placed upon an apertured gate plate adapted to be riveted to the chassis.

It would also be noted from Figures 1 and 3 that depressions or beads 47 and 48 are struck inwardly in one side wall of the lower housing or bottom plate 9. The depressions snap over small flat lips 47' and 48' which extend forwardly as viewed in Figure 1 from the side edges of the chassis and in its plane. Similar constructions not shown are provided for the other side. These formations assist in holding the two parts of the magazine housing in position.

An embossing 50 is struck upwardly in this chassis plate to form an upper wall of a shallow housing which protects the film from gears and other moving parts. Strengthening ribs 51 radiate from this embossing. A higher protective embossing 52 surrounds the take-up drive of the magazine and is disposed directly above an opening 52' in the bottom of the magazine for the reception of a driving connection from the camera. These embossings also act as light traps. Thus all of the driving mechanism is disposed in this housing formed between the chassis and the bottom plate. As is best seen in Figure 9 gears for the take-up and a controlling or locking member for the take-up mass T and delivery mass D are directly mounted upon the under-side of the chassis plate and extend downwardly therefrom. With the exception of one compound gear for which a long bearing is provided these gears are so thin and light that the single bearing furnished by this one plate is ample. If desired the bearings may extend from the chassis through the bottom plate, with play allowed for the slight relative movement between chassis and bottom but such double mounting is generally unnecessary and detracts from the full advantages of our invention. For an alternative construction, preferred in some cases, wherein all of these members are directly mounted upon the bottom plate and the chassis member supports only the film-guiding members, see Figures 21 to 25. For another preferred construction wherein the chassis plate is eliminated and these members mounted directly upon the bottom housing of the magazine see Figures 19 and 20 hereof.

The drive for the take-up mass T is transmitted through the mechanism shown in Figures 1, 3, 4 and 9. A main driving gear 53 for coaction with a driving gear 54 (Figure 9) upon the film-handling apparatus C is positioned upon the magazine as previously stated within a cup or depression 52, the sides of which as shown at 55 are bent upwardly to form a bearing. Gear 54 is driven by a spring or other motor of the film-handling apparatus. Attached to and revoluble with and surrounding gear 53 is a spur gear 56 which is irregular in vertical cross section in that it includes a cup-shaped or bell-shaped upwardly extending portion 56' within which gear 53 is disposed. This spur gear engages and drives spur gear 57 which by a short shaft 58 is mounted in a suitable depression 58' of the embossing 50 of chassis 13. In turn gear 57 engages and drives a third gear 59 journaled upon a short shaft 60 likewise mounted in the chassis plate in an opening 61 in embossing 50 and in a manner which will be clear from a consideration of Figures 12 and 13 later described yieldingly drives the take-up mass.

Gear 53 also positively drives a footage recording device or meter as is best shown in Figures 2 and 9. This gear is attached to or formed upon an upstanding shaft 62 which as by a pin 63 is attached to and revolves a tube 64 which is formed with or to which is attached a gear having a single tooth 65 which drives the meter. As will be best seen from Figure 2, the indicating portion of this meter consists essentially of a relatively large flat gear 67 journaled upon a headed pin 68. Together with a slightly offset resilient disc 69 (Figure 9) this pin forms a friction bearing for the indicating gear 67 so that it is maintained in the position to which it has been moved by the drive but can be reset. This pin is attached to and extends downwardly from an upwardly extending embossing 73 in the top or cover member within and close to the lower face of which this gear is revoluble.

Mounted on the top of this indicating gear is a card 67' with various figures or indicia indicating the length of film which has been or remains to be exposed in such position that as the gear revolves they are visible through a suitable colored protective window 75. Alternatively these numbers may be printed or otherwise formed directly upon the indicating gear. This indicating gear also is formed with a reset lug 76 which coacts with a starting projection or stop 77 and a finish stop 78 which are embossed or inserted in the embossing 73 on the top of the cover. Motion is transmitted to this indicating gear 67 by an intermediate compound spur gear 79 having a bottom face 80 which is driven by the single tooth 65 which is directly power driven by the mechanism of the apparatus and a top face 81 which consists of a single tooth which engages and drives the indicating gear. By reason of the above construction it will be clearly seen that no problems of light trapping and re-setting are presented.

As a fresh film is inserted in the magazine a worker simply pushes re-setting lug 76 back to contact with the starting projections. Since the indicator is not spring pressed in the direction of its operative travel or the one contrary thereto it does not have to be held in place as the magazine is assembled. Other meters for use within a magazine which are spring pressed contrary to the direction in which they are driven must be held in their starting position as the magazine is assembled, as is a difficult task. Thus an efficient and simple metering or footage recording device is provided.

As will be clearly seen by reference to Figures 12 and 13 (Sheet 4) we supply a simple and efficient take-up device generally indicated as 18 which we believe to be novel. Shaft 60 upon which gear 59 revolves has a square support portion 82 which coacts with an appropriate squared opening in a take-up core 83. This core rests upon a bottom flange 84 which is attached to or formed as a part of post 82. To this core an irregularly or S-shaped leaf spring 85 is attached merely by being slipped within a vertical slot 86. The edges 87 of this spring bear against a radial internal slot 88 formed in the upper portion of a take-up tube 89 upon which the film is wound and to which it is attached as by a clip 90. If desired this circumferential internal slot may be knurled or otherwise roughened to increase the frictional contact between the spring, which is driven directly by the power of the apparatus, and the take-up tube which supports and rotates the film. Assembly consists merely of compressing the outer portions of the spring slightly as the tube is slipped over. The slot holds the spring in place. The line of the film when the delivery mass D is full is indicated by a dash-and-doubledot line and when the take-up mass T is full by a dotted line.

As explained in introductory portion of this specification it is necessary or at least highly desirable to lock the delivery mass when the magazine is not in use and to prevent the unwanted unwinding of the take-up mass and delivery mass. As will be seen by reference to enlarged Figure 11 we supply a very simple device which accomplishes this result. It consists essentially of a locking dog or locking member or lock 91 having a single blocking tooth 92 formed in its lower and leftward end as viewed in that figure. This tooth coacts with the teeth of gear 56. The other end of the dog or lock is formed with an opening 93 which surrounds but is larger than a disc 94. A light leaf spring 95 tends to rotate the dog clockwise about the disc so as normally to bring the blocking tooth 92 of the dog into contact with the teeth of the gear. Preferably the coacting surfaces of the opening and delivery spindle are slightly roughened. Disc 94 is extended through a bearing in embossing 50 to form a squared delivery post 94' upon which a collar 96 is forced adjacent the top of the embossing. This collar supports a delivery block 97 which is circular in cross section and embodies a vertical cut 98 into which the delivery end of the film is slipped.

By reason of this construction it will be seen that except as gear 56 is revolved in a clockwise direction coaction of the cam surface 92 of the dog and these teeth prevent the gears from moving in an unwinding direction and hence prevent the unwanted unwinding of the take-up mass. Similarly opening 94 is forced against the delivery spindle so that under these conditions spindle 94' and the delivery mass are blocked against movement in either direction. As a practical matter it will be understood there is no chance of the take-up mass moving in a taking up direction except when power is applied through the gears. When, however, gear 56 by the power of the apparatus is moved clockwise or in the direction of the arrow of Figure 11 dog 91 is rotated anti-clockwise against the light power of spring 11 and the structure is freed. This dog may be made of fiber. Spring 95 is extremely light and consequently there is almost no drag upon the spring motor of a camera and no appreciable noise.

We have described above the instrumentalities which move the film within the magazine, those which support the moving elements and those which record the length of film which has been moved. We shall now describe the gate and the other devices which guide and position the film as it is being fed and condition its movement.

As previously stated the gate consists essentially of a fixed apertured gate plate and film guide generally indicated as 14, a presser member 15 and a multi-purposed relatively long spring 16.

This relatively fixed apertured guide and gate 14 is formed with an aperture 100 which coacts with a similar aperture 101 in a front wall of the magazine and a lens 102 upon a camera C when the magazine is disposed in a magazine-receiving receptacle or compartment 103 and held therein as by springs 104. See Figure 3. These parts of the combination are not described in detail because they are conventional in themselves but it should be remembered that the critical positioning of the film in its focal plane depends upon coaction between a front wall 106 of this receptacle and a forwardly facing lug of the magazine.

In the form of the invention shown in Figure 1 and those corresponding thereto a rigid lug 107 is extruded and projects forwardly from and is integral with fixed gate plate 14, as can well be seen from Figure 5. An opening 108 in the front wall of the magazine and a corresponding opening in the gate plate disposed adjacent this lug admit a pull down claw P (Figure 3) powered by the motor of the apparatus as for example in the manner taught by the Morsbach United States Patent Number 2,175,538 dated October 10, 1939, or in the United States Patent Number 2,206,032 dated July 2, 1940, of the senior applicant hereof. This lug may be carefully ground since its accuracy is responsible for positioning the film contacting surface 111 of plate 14 in the focal plane of the lens. It will be understood, however, that when the chassis is positioned by a spring this lug need not be ground after the assembly of the magazine. So far as the magazine is concerned, the focal plane is automatically determined by the distance between the face of the lug and the back of the plate. No other factor in the magazine is involved. Plate 14 may be relieved, as is common in this art, as is shown in Figure 6, so that it makes contact only with the edges of the film.

We believe this gate and guiding plate 14 to be novel. It is formed with a positioning portion 115 offset to the rear or to the right as viewed in the drawings from the front surface 111. This offset portion is disposed at a right angle to the upright film engaging portion, to which it may be spot welded at such points as 113 and 114, and parallel to the chassis and bottom plates. It will thus be understood that as the magazine is viewed in Figures 1 and 4 to 8a and when resting upon its bottom this plate consists essentially of a main vertical portion, curved to conform to the vertical front and side walls of the magazines and disposed close thereto, which contacts the side of the film, and guides it and a horizontal portion or flange disposed at a right angle thereto which serves both as a positioning instrumentality for the gate plate as a whole and as a guide for the lower edge of film. Openings 116 and 117 are aligned with openings 116' and 117' in the forwardly facing flange 32 of chassis member 13. To assemble the fixed apertured gate plate with the chassis the flange of the gate plate is merely slipped underneath this forwardly facing flange of the chassis and rivets or bolts are introduced through openings 116—116' and 117—117'. Alternatively spot welding may be employed, preferably following the introduction of positioning pins. Fixed apertured plate 14 may be further supported by a rivet or pin which is passed through an opening 118 in its rearward end and a cooperating opening 119 in locking and positioning lug 34 which extends upwardly from the chassis and at right angles to its surface. For other and preferred means of mounting this plate upon the chassis see Figures 30 to 33 (Sheet 7) hereof.

Presser member 15, which holds a film against this gate plate at its aperture and is positioned backwardly thereof, consists essentially of a main vertical portion suitably relieved which engages the side of the film opposite that which is engaged by surface 111, two forwardly facing edge guiding lugs 120 and 121, and a backwardly extending finger piece generally indicated as 122. See Figures 1, 6 and 7. These edge guiding lugs are turned forwardly or to the left as shown in the drawings and coact with openings 124 and 125 cut in the top surface of plate 14. Finger piece 122 may be formed integrally with plate 15 or may be attached thereto. In any event it is slightly resilient. It comprises a downwardly offset portion 126 and an extreme rearward portion 127 which is bent slightly upwardly. The offset portion or depression 126 furnishes a convenient finger hold. Upwardly inclined portion 127, which only slightly extends above the vertical plane of the top of this presser gate, bears against the under surface of cover member 11 when the magazine is assembled and tends to press or hold the presser plate and the film downwardly. See Figure 7. This presser plate is completed by a resilient positioning finger 128 which locks the film against rearward movement in the gate but readily permits its forward movement in an exposing or projecting direction.

Multi-purposed spring 16 which resiliently holds this presser plate in position comprised a delivery tensioning arm 130 having a curved extremity 131, a take-up tensioning surface 134 having a curved extremity 135 and a central portion embodying portions 136 and 137 which are curved forwardly or to the left as shown in the drawings and when the gate is completely assembled bear against the upper and lower portions respectively of the presser member. Longitudinal ribs 138 tend to strengthen the spring at this point and give it added rigidity. In accordance with the principles of the Bundick and Proctor tension control system of feeding and various improvements included therein, which we employ in the practice of this invention, the magnitude and periodicity of this spring and its shape must be very carefully calculated.

After fixed apertured gate plate 14 has been positioned as previously described the assembly of the gate is completed without the use of a tool of any kind. Spring 15 is slipped over the upstanding forward lugs 28 and 29 and upstanding lateral lugs 30 and 31. Thereupon presser plate 15 is placed between the multi-purposed spring and the fixed apertured gate plate. Previous to this assembly the film may be placed in position. Alternatively all that is necessary for a worker to do in order to position the film is to place his finger nail in depression 126 and press the presser member backwardly and downwardly thus causing the top of the presser plate to move backwardly and largely freeing the film channel. The edge guides are thus moved from guiding position. He then lays the film in the top portion of its channel thus freed. In order to free the lower portion of the film track after the film has been so placed approximately in position but slightly higher than is desired for operation the operator grasps the lower portion of the finger hold with his thumb and finger and pulls the presser member straight backwardly and the film falls into position. This operation is a matter merely of a second or two.

As has already been made clear this gate structure embodies the Bundick and Proctor tension control system of feeding which is a complete and successful equivalent for continuously driven sprockets with their associated loops of slack film, as developed by the senior inventor herein and in said Morsbach patents for use within a magazine. This system furnishes compensation for the difference in character of movement of the continuously revolving delivery and take-up masses of the film and the intermittently moving section of the film at the gate in a manner which is much more simple, positive and free from trouble than the conventional sprocket, as well as less likely to injure the film. Experience over many years has proved that images which are photographed or projected by this system are as steady as those with a sprocketed compensating system and very often more so because there is no unsupported loop to be lost or otherwise to cause trouble. Reference may be made to the above noted Patents 1,944,022, 1,975,782, 2,159,998, and 2,175,538. We shall now briefly explain how the Bundick and Proctor system operates in this magazine.

As the film travels through the gate from the delivery mass D to the take-up mass T under the influence of the intermittent pull-down P it is at once placed under a condition of tension. This causes the take-up tension arm 131 to be depressed or moved away from the adjacent wall of the magazine and toward the center thereof and to be placed under a condition of increased tension. A portion of the pull so exerted upon the film is directly communicated to the mass of film carried by the delivery core 97 and a small portion of the film drawn therefrom. As the film comes to rest in the gate to be exposed the tension arm 131 urged by the power thus previously stored in it moves upwardly as viewed in Figure 3 and toward the adjacent wall of the magazine and thus draws from the delivery mass an additional supply of film. Simultaneously with the conclusion of this upward movement, however, the intermittent pull-down comes into action and the film is again moved through the gate. This timing is important. A portion of the film required to compensate for that so moved is drawn in part directly from the source of supply upon the delivery mass and in part from the small length of film which has been fed forwardly by the previous upward movement of the tension arm 131. Since in the delivery mass and its support there is a certain resistance to rotation by reason both of inertia and friction, this mass is caused to move at intermittently varying rates of speed at different parts of each feeding cycle but in actual practice it has been found that under ordinary conditions of operation it never comes to a complete stop. The end of the multipurposed spring also serves as a cushioning medium between the intermittent feeding mechanism and the film on the delivery mass.

The amount of film displaced by each upward movement of the tension arm 131 has been found ordinarily to be considerably less than the amount required for one full frame or picture, or in other words, actually less than the length of film which is actually moved through the gate in each complete cycle. The balance of film required for each cycle, and representing the excess beyond that provided by the upward movement of the tension arm 131, is pulled directly from the source of supply.

Below the gate the corresponding tension member 134 in the form of a flat spring over which the film travels operates in substantially the same fashion. As the film is fed by the action of the intermittent feeding mechanism the tension of the spring member 134 causes it to remain in contact with the film and to keep it under tension. Thus the spring draws the film away from the pull-down and prevents the accumulation of slack. In the meantime, however, the rotation of the take-up mass effected by mechanism hereinbefore described tends to wind the film upon the yieldingly driven take-up reel support and to compress the spring 134 ready for the beginning of the next cycle of operation. Thus the tension of the film itself and of the spring 134 is opposed to the driving means for the take-up mass, the balance between the two in the Bundick and Proctor system being maintained exclusively by and through the film. As is explained in patents to which reference has been made above these two long film engaging members supply tension of two magnitudes. The one of greater magnitude tends to overcome variation in feeding conditions while that of lesser magnitude operates in step with the pull-down.

Another important factor in this system of feeding is the spatial arrangement of the parts so that the film always engages the tensioning members in a bight.

From the foregoing, it will be apparent that from the beginning of the feeding movement the film is automatically placed under the desired condition of tension and that this condition is automatically maintained during the operation of the apparatus. It will also be clear how this system differs from the attempted use of buffering springs which do not have the characteristics noted above.

Experience has demonstrated that the above method of feeding film whereby the film is maintained under conditions of continuously controlled tension throughout its entire operative length and whereby the two masses are moved in certain timed relation or synchronism with the intermittent movement at the gate effects feeding of the film with considerably less wear to the perforations than is possible with the conventional method of feeding involving the use of continuously rotating feeding and taking up sprockets (or a single sprocket) associated with unsupported loops of slack film. Although we prefer to utilize this tension control system as herein described, it will be understood that the utility of our invention is not limited with respect to any particular mechanism for effecting film movement and that any desired form of sprockets, take-up mechanism, and the like, with their associated loops of slack film, or any other desired feeding mechanism, may be used if preferred.

The foregoing description presents this Bundick and Proctor system of feeding in its preferred form. It will be understood that a portion of its marked advantages may be enjoyed even though it is not employed in its most fully developed embodiment.

As previously stated we may prefer to form the top edge guide of the gate from a multi-purposed resilient member otherwise corresponding to spring 16 as has been previously described. This construction will be clear from Figure 6a upon Sheet 3. Single spring 201 in construction and operation corresponds to multi-purposed spring 16 previously described except that edge guides 202, of which only one is shown, are projected forwardly in a horizontal plane from its top edge in a direction normal to the main surface of the spring so that they engage a presser member 15' and an apertured gate plate 14' at the top thereof and bear against the top edge of a film f as it passes therebetween. Alternately these guides may cooperate with shallow notches cut in the top of the presser and fixed apertured plates, thus serving to hold the presser member against upward movement. This spring 201 may be held in place as shown in Figures 1 and 3. A post 30' prevents too great movement toward the interior of the magazine, this post being turned upwardly from a forward extension 32' of a chassis plate 13' and overlying a backwardly turned extension or flange 115' of apertured gate plate 15'.

Likewise as previously stated and as is clearly illustrated in Figures 7a (Sheet 3) and 7b (Sheet 5) we may prefer to hold a multi-purposed resilient member in position upon the chassis plate, or alternatively upon the bottom of a magazine, by a bayonet and slot connection.

A multi-purposed spring 211 is formed with or attached to a backwardly or rightwardly turned flat positioning surface 212 thereof turned at right angles to the main surface of this spring. This flange includes an irregularly shaped opening 213 which cooperates with a headed screw 214 (or, alternatively, a bolt or rivet) mounted upon a forward or leftward extension or flange 215 of a chassis plate 216 corresponding to plates 13 or 13'. Alternatively this structure may be mounted directly upon a bottom plate. Positioning lug 226 determines the position of both gate members and hence of the focal plane, as it engages a wall or other portions of the magazine receiving compartment of the apparatus. Spring 211 contains two forwardly extending curvilinear portions 218 and 219 which bear against the rearward portion of a presser member 220 having edge guides 222 and 223. These edge guides cooperate with appropriate slots or notches formed in the top of a front apertured plate 224 and extending adjacent a front wall 225 of the magazine. It will be seen that the film f is held firmly in place between a presser member and the apertured gate plate. This gate plate embodies a forwardly facing positioning lug 226 and an aperture 227 which coacts with an aperture 228 formed in the front wall of the magazine. It will be noted that this aperture is formed with an extension which accommodates the lug 226, the whole structure being suitably light trapped. A combined finger piece and positioning member 230 projects backwardly from the upper edge of the presser member, as previously described.

A preferred embodiment of the gate structure according to our invention is presented by Figure 17 (Sheet 5). According to this form a multi-purposed spring member 241, corresponding to those previously described, is fixedly attached as by spot welding to posts 242 and 243 which are struck upwardly from a forward extension 244 of a chassis plate 245 which is mounted preferably by a spring not shown in this figure but corresponding to the showing of Figures 3, 3a, 3b and 4 or alternatively in the manner illustrated in Figures 19 and 20 hereof to a bottom plate 246 of a magazine. It is to be particularly noted that this spring, before being compressed by the introduction of a presser member 24, forms an arc between the forward surfaces of posts 248 and 249 but when it is compressed in order to give resilience to the presser member 250 approaches a chord 252 of that arc. One great advantage of this structure is that if one portion of the film has greater thickness than normal the presser member readily yields to permit its passage. Moreover, pressure is applied at a single section immediately to the rear of an aperture 253 formed in a front wall 254 of a magazine and in a long apertured gate plate 255 corresponding to those previously described. In other respects this construction can be similar to that presented hereinabove. Hence the other parts are not described in connection with this figure.

An important, preferred and simplified modification of our invention is shown in Figure 18. According to this form, a single multi-purposed resilient member in addition to acting as a delivery and compensating member is itself a resilient pressure plate.

A chassis 257, similar to chassis plates 245 of Figure 16 and 13 and 13' previously described, is formed with a forwardly extending flange 259 slightly offset from the body of the plate and parallel to its plane from which two posts 260 and 261 extend upwardly at right angles to said planes. These posts embody slots 262 and 263 with which headed rivets 264 and 265 interfit. These rivets are attached to the rearward or rightward surfaces of multi-purposed resilient member 258. A central portion 266 of this spring engages a film directly and serves to hold it against an apertured plate 267 corresponding to that previously described. It will be understood, therefore, that this one leaf spring embodies a presser plate and furnishes thereto the necessary resilience. A combined finger piece and positioning member 268 similar to that previously described may be formed with or attached to this multi-purposed member and extend therefrom rearwardly and upwardly. Edge guides 270 and 271 are turned forwardly or leftwardly from this leaf spring at right angles thereto and engage both the film and the front apertured plate 267 in appropriate slots not shown. It will be understood that the backwardly or rightwardly extending portions 272 and 273 of this single resilient member furnish the necessary compensation for the delivery and take-up masses respectively in the manner previously described and that the body of this one element also serves as a presser member. Since the other elements of this form of our invention are similar to those previously described it is not necessary to explain them again.

We have shown this multi-purposed member mounted upon a chassis plate but it will be readily understood that it may be mounted upon the bottom housing of the magazine.

The assembly of the film in a magazine built according to this form of the invention is most simple. The film is laid in position against apertured plate 267 and held there by the fingers of one hand of a worker while with the other hand he flexes the forward portion 266 of the multi-purposed spring backwardly to a plane to the right of that shown in Figure 18 and slips it into position with the headed rivets engaging their slots. Then he releases the forward portion of the spring and it engages the rearward portion of the film and the assembly is complete within a matter of a few seconds, no tools having been required. If, however, the resilience of the film tends to spring it away from the inner wall of the magazine after it is laid thereagainst it may first be held in that position by clips attached to an upstanding rim of the bottom portion of the magazine while the gate is being placed in position and the clips later removed.

Alternative to the above edge guiding structures which have been described in previous portions of the specification the simple form shown in Figure 8a (Sheet 3) may well be employed. It consists essentially of a plurality of light leaf springs generally indicated as 281 of which only one is shown. Each of these springs has a base and positioning portion 282 bent backwardly or to the right at substantially a right angle, a main vertical portion 283, a top finger hold 284 and a downwardly bent portion 285, which engages and guides the top edge of the film at a point along the top of a presser plate 286, and a front apertured member 287. The bottom portion 282 of this spring is slipped under a projecting flange 289 formed in the top of a chassis plate 290 which is mounted as previously described. To move this edge guide from guiding relation so that a film may be inserted or removed a worker merely inserts his finger nail in front of the hold 284 and swings the spring away from the front of the magazine so that the film or the presser plate may readily be moved from or to a position between the gate plates. To reassemble he merely permits the spring to snap back into position. Alternatively such a spring may be removably attached to a bottom plate or may be spot welded to a chassis plate or to a bottom plate.

As made clear hereinabove we prefer to mount our chassis plate so that it is permitted slight movement in a direction along the optical axis of the magazine. As previously repeatedly stated, however, many of the advantages of our invention may be secured if the chassis member is rigidly attached to a bottom wall 297 of a magazine. A rim 298 upturned from the chassis plate bears against a depending wall 299 of cover member 300 and furnishes an additional bearing surface which assists in the positioning and support of the entire housing. Latching members 301 upstanding from the plane of the chassis have the characteristics previously illustrated and described. In other respects also the structure may be as previously described.

As previously repeatedly stated herein we prefer the use of a chassis member but many of the objects and advantages of this invention can be obtained in those instances in which we mount all of the parts upon a bottom plate of a magazine which carries all of the operative parts except the indicating portion of a footage counter or meter. Figures 21 to 25, both inclusive, upon Sheet 6 hereof, show such a structure. We illustrate this form of our invention in a magazine wherein the bottom housing is merely a flat plate with low edges or flanges but it will be understood that we are not limited to such a structure but if we wish may employ a magazine wherein the bottom has high edges or sides.

As illustrated a bottom casing 310 includes flanges 311 extending upwardly from the periphery of the broad flat surface of the bottom. These flanges in places are extended further upwardly in the form of positioning and locking lugs 312 which coact with the cover in a manner generally similar to that shown in Figures 14 and 15 previously described. Ribs 314 in the bottom plate are employed to strengthen this housing.

A front fixed apertured gate member 321 having a backwardly extending right-angled mounting formation 322 and a forwardly facing positioning lug 323 and an exposure aperture 324 is fixedly mounted upon the bottom plate. This mounting plate and the bottom of the magazine are parallel and closely adjacent. Rivets 325 attach the mounting formation 322 to the bottom plate and a rivet 325' attaches the rearward end of its main or film-engaging surface to the flange.

A presser member 326 embodying edge guides 327 is constructed as previously described and when the parts of the magazine are assembled is pressed forwardly toward the lens by a multi-purposed spring 328 having two forwardly facing curved portions 329 and 330 which engage the back side of the presser member. A pull-down P draws the film through the gate conditioned by the tensioning members later described. This spring also includes a delivery tensioning portion 331 and a take-up tensioning portion 332. This spring is formed with or has attached to it a backwardly extending positioning flange 334 which rides over the central portion of the mounting formation 322 of the front apertured gate section adjacent the bottom of the magazine. This flange includes a bayonet slot 335 for the reception of a pin having a head 336 and a shank 337 which is firmly fixed in the bottom plate 310 of the magazine. Also turned backwardly from this spring or attached thereto are lugs 341 and 342 which make contact with embossings 314 and limit the inward movement of the spring.

As will be clear from a consideration of Figure 23 each locking projection 312 is formed with an outwardly extending upper curved shoulder 344 which makes contact with an embossing 345 in a wall 346 depending from the top cover 347. A delatching pin 348 completes this structure and is operated as is shown in Figure 24 by means of a holding fixture 349 and an uplatching tool 350 as more fully described in connection with Figures 14, 15 and 16. A portion 351 of the bottom plate or housing 310 is offset upwardly as indicated at 352 to form a housing for the various driving elements for the take-up which are mounted therebelow. As at 353 a collar is formed in this upward portion of this plate to create a bearing for shaft 354 of compound gear 356. A cover plate generally indicated as 357, having an opening 358 (Figure 25) for the reception of driving gear 359 of a camera, is spot welded or riveted as 360 and 361 to the bottom plate after the various gears have been assembled upon the bottom plate.

The bottom toothed portion as seen in Figure 25 of compound gear 356 engages a spur gear 371 revoluble upon a pin 372 in a depression 373 formed in the upwardly extending protective formation of portion 351 of bottom plate 310. This gear in turn drives another spur gear 374 which in the manner previously described in connection with Figure 9 drives a take-up structure generally indicated as 376. Since this structure may well be identic with take-up structure T illustrated in Figures 9, 12 and 13 we are not again describing it in detail.

A footage recorder or meter having a dial plate 377 revoluble with a spur gear 378 upon a pin 379 in the top of cover 311 shows the footage of film which has been or remains to be exposed and is visible through an appropriate window not shown. As previously described in connection with Figures 2 and 9 this meter is driven by a one toothed gear 380 revoluble with main driven gear 356 by shaft 354. This one toothed gear engages and drives a spur gear formed as a part of a compound gear 381, mounted upon a pin 382 likewise in the top cover of the magazine, which has a single driving tooth. This tooth engages spur gear 378 and hence operates the meter. It may be reset by lug 383. Since this construction is the same as that previously described in full further details need not be given at this point.

As we have also repeatedly pointed out hereinabove and clearly shown in Figure 26 if desired we may employ a conventional bottom housing 386 having high sides 387 which is completed by a cover 388 having short sides 389. As in Figure 25 a bottom cover plate 390 riveted as at 391 to an upwardly struck formation 392 in the bottom plate protects gears such as 393. Otherwise this embodiment of an invention may be as previously described.

A most important modification of our invention which we prefer for many purposes is illustrated in Figures 27, 28 and 29 upon Sheet 7. As shown by these figures we position the entire magazine and hence the film in a plane normal to the optical axis of the apparatus by means of a lug which is formed upon the chassis member and not upon the apertured gate member. The apertured gate member is firmly fixed upon the chassis adjacent the lug. From this figure it will be observed that chassis plate 403, which in many particulars corresponds to the chassis members previously described, is formed with an upstanding forward positioning post 404 having a forwardly facing positioning lug 405. This lug projects forwardly and freely through an opening 406 formed in a front wall 407 of a cover 408 of a magazine and makes contact with a face 409 of a magazine receiving compartment 410 of a camera. A fixed apertured gate plate 412 corresponding to plate 14 previously described is rigidly attached to the chassis plate. A portion 413 of this fixed gate plate is turned at right angles to its portion which engages the film and extends parallel to and below the lips 414 of the chassis plate which are slightly offset upwardly from the main body of the plate and parallel thereto. Rivets such as 414' firmly attach gate plate and chassis plate. If desired other attaching means shown herein may be used instead of those illustrated in these figures. A presser member 415 having edge guides 416 and 417 and a combined finger and positioning piece 418 is mounted as previously described and is pressed forwardly by a multipurposed spring member 419 which is held in place upon the chassis member in any one of the several ways previously and hereinafter described as by lugs 420 and 421 which are turned upwardly from this plate. Lugs 422, of which only one is shown, turned upwardly in the offset portion 414 of the chassis plate, limit inward movement of the tensioning portions of the multi-purposed spring. It will of course be understood that a film f is drawn between the presser member and the fixed apertured gate member by a pull-down P. The chassis plate 403 rests upon the bottom 423 of the magazine. It may be spring pressed as previously described or riveted.

As will be clearly seen in Figures 30 and 31 upon Sheet 7 we may prefer to mount a fixed apertured gate member upon a chassis member or alternatively upon a bottom plate of a magazine in an even more simple manner than that previously described. In this form of our invention it is preferable that a positioning lug which determines the focal plane of a film in the magazine be formed upon or attached to a chassis plate as illustrated in Figures 27, 28 and 29 although if desired it may be placed upon a gate plate.

A chassis plate 451 is formed with an offset forward projection 452 parallel to but above its main surface which contains an oversized opening 453 which accommodates a headed pin 454 which is rigidly attached to a backwardly extending mounting formation 456 formed in an apertured fixed gate member 457. As previously described the chassis member is positioned above a bottom plate 458 of the magazine. Preferably the chassis plate is forced slightly forwardly toward the aperture by a mounting spring 459 of the type previously described until a positioning lug 460 extending forwardly from an upwardly extending formation of the chassis engages a fixed and accurately formed wall, not shown in these figures, of a magazine receiving compartment.

It will be seen that when the chassis member is placed over the mounting formation of the apertured gate member this spring tends to force the chassis forwardly until pin 454 engages the right or rearward portion of openings 453 thereby forcing the apertured gate plate forwardly to its correct position. This position is therefore determined by a positioning lug formed upon the chassis and by coaction between pin 454 and opening 453.

Other portions of this construction may be as previously described. A lug 471 struck upwardly from the bottom portion of the chassis plate may engage a multi-purposed spring 472 similar to those previously described and hold it in place. Lugs 473 of which only one is shown may be struck upwardly from the offset portion 452 of the chassis plate in order to limit the reciprocating movement of the delivery and take-up conditioning portions of the multi-purposed spring. This spring engages the rearward side of a presser member 457 to force it forwardly against a film which in turn is held in running position against a film contacting portion of the apertured gate plate. Edge guides 476 may be formed in or attached to the presser member. It will thus be seen that in such respects the construction of the embodiment of our invention is similar to that previously described.

Figures 32 and 33 show another simple mounting for a chassis member which may be employed with any form of our invention but is particularly applicable to one in which a spring is not employed to position a chassis plate within a magazine. Although shown with a chassis plate this mounting may be used to fasten a gate structure directly to the bottom of a magazine.

In this form of our invention a chassis plate generally indicated as 491 embodies an offset positioning portion 492 which is parallel to and adjacent a bottom plate 493 of a magazine. A positioning pin generally indicated as 495 is mounted in the chassis for rotation relatively thereto. It extends through a U-shaped opening or slot 498 formed in a backwardly extending portion 499 of a fixed apertured gate plate having a film contacting portion 500. This pin ends in a head 501 formed immediately above a cam-shaped enlargement or collar 502 which engages the sides of U-shaped slot 498.

To assemble this structure after the chassis member has been attached to the bottom plate (or slipped in place in case a positioning spring is used) a worker merely drops the apertured gate plate into place and slightly rotates head 501 anti-clockwise as seen in Figure 32. This action forces the apertured gate plate slightly forwardly until it reaches the focal plane. It will be understood that this movement is very slight and merely enough to accommodate minor manufacturing variations in the construction of the apparatus. In this form of the invention we generally prefer to place a positioning lug 503 directly upon the apertured gate member rather than upon the chassis member but either construction is practicable. It will of course be understood that the plane of the forward surface of this lug is very carefully formed.

In other respects the construction of the gate and indeed the entire magazine shown in part by Figures 32 and 33 may be as previously described.

In the important embodiment of our invention shown upon Sheet 8 in Figures 34, 35 and 36 we mount all film engaging portions of a magazine upon a chassis member 521 and all film driving members upon a bottom plate 522. This bottom plate is shown as having short upstanding flanges 549 but if desired it may be of the conventional type wherein the sides extend upwardly to a point above the top of the film and adjacent the cover.

As will be clearly seen from Figure 34 this chassis plate has an upwardly offset forward portion 523 parallel to the bottom plate of the magazine face from which lugs 524 and 525 are struck upwardly to hold in position a multi-purposed spring 527 having a delivery tensioning portion 528 and a take-up tensioning portion 529 as previously described. A fixed apertured gate member 530 is shown as including a forwardly extending positioning lug 531 and an offset right angled mounting portion 532 extending rearwardly from the film engaging portion and as by rivets 536 and 537 fixedly attached to the chassis. A presser member 539 includes edge guides 540 and 541 and a combined finger piece and lateral positioning member 542. The multi-purposed spring forces the presser member against the film and the film against the apertured gate member which by means of the positioning lug is held closely in the focal plane of the lens of the camera. Further description of this gate structure is not necessary. It must be emphasized that to this form of our invention we may apply any of the various gate arrangements previously described in which all film contacting members are supported by the chassis plate and not by the bottom of the magazine.

This chassis plate is mounted upon bottom member 522 either fixedly or preferably by a spring 545 which on one side engages lugs 546 and 547 struck upwardly from the chassis plate and on the other engages a rear rim 549 of the bottom of the magazine and a depending side 551 of the top cover 550. This construction of the spring and its associated parts may be as previously described in connection with Figures 3, 3a and 3b. Alternatively the chassis plate may be permanently fixed as by rivets or screws to the bottom plate but we prefer the spring arrangement. It should be particularly noted, however, that relative movement between the bottom plate on one hand and the housing of the magazine and the chassis member on the other hand is very slight and merely enough to overcome manufacturing variations. Locking lugs 553 cooperating with protuberances 554 may be constructed as previously described to hold the bottom and top housings together.

A central portion of the chassis member is slightly offset upwardly and parallel to its main plane as indicated at 555 to form a housing for the gears which are attached to the bottom plate. Certain details of the light trapping of this form of our invention will be described hereinafter.

These gears receive their power from gear 560 of a camera. They include a main compound driving gear generally indicated as 561 which has a motion-receiving toothed portion 562 driven by said gear 560 of the camera and disposed or formed within another toothed portion

563, all as previously described. This structure is mounted in an inwardly or upwardly struck protuberance or bell 565 of the bottom plate 522 and revolves therein. A shaft 566 is attached to this gear structure and extends further upwardly and terminates in a one toothed gear 568 which drives a compound gear 569 having a driven portion 570 in the form of the spur gear and a driving portion 571 in the form of one tooth, this compound gear being revoluble upon a pin 572 which is attached to cover 550, all as is clearly shown in Figure 36. This one toothed gear in turn drives an indicating spur gear 575 attached to a plate 576 carrying figures indicating film footage used or remaining and revoluble upon a pin 577 placed in the cover, the connection between the pin and the indicating gear including a slip construction so that the plate may be reset. We later describe a preferred construction of our invention wherein the indicating as well as all driving instrumentalities of the meter are carried either by a chassis plate or by a bottom member.

The driving portion or formation 563 of the compound gear engages and drives a spur gear 581 revoluble upon a pin 582 placed in the bottom plate 522. This gear in turn drives a spur gear 584 mounted upon a pin 585 fixed to the bottom plate 522. Through mechanism such as that previously described gear 584 through a slip clutch drives a take-up roll or mass of which only shaft 586 is shown in this figure. Since this construction may be the same as that previously described it need not be further explained at this point. Shaft 586 corresponds to shaft 82 of Figures 11, 12 and 13.

For the reasons previously set out at length we prefer to lock both the delivery and the take-up mass of film except when a feeding operation is being carried on. To this end we supply a blocking plate 591 which is closely similar to blocking plate 91 described in connection with Figures 3, 11 and 12. Tooth 592 as previously described engages with one of the teeth of gear 563 except when the powered revolution of that gear forces the blocking plate anti-clockwise as shown in Figure 35. An oversized opening 593 formed in the opposite end of this plate encircles an annulus 596 formed upon pin 597 and in the manner previously described prevents revolution of the delivery mass when the drive is at rest. When, however, gear 563 is revolved clockwise as will be seen in Figure 35 plate 591 is moved against the power of light spring 598 and thereupon the drive and the delivery mass are freed from restraint.

As will be best seen by reference to Figure 36 an inward extension or bell 600 of the bottom plate 522 surrounds compound gear 561 and an opening 601 formed in bottom plate 522 to admit the driving gear 560 of the camera. An upwardly extending shoulder 602 of formation 555 of the chassis plate has light trapping extensions 603 offset therefrom at right angles thereto which together with the bell forms a barrier against light leakage. These extensions extend over the top and sides of the bell. It will be understood that pressure from spring 545, if it is used, tends to keep this formation in engagement with the bell 600 thus preventing fogging of the film within the magazine.

Figures 37, 38 and 39 which appear upon Sheet 9 show that embodiment of our invention wherein all of the portions of a meter or footage recording device are carried by either a chassis, as in the structure of Figure 37 or 38, or by a bottom plate, as in the structure of Figure 39. As will readily be understood by those who are skilled in this art this arrangement much simplifies the placing of a fresh film in a magazine, the original assembly of the magazine, the setting of the meter back to zero (or to its maximum point as the case may be) and the assembly of the magazine after servicing. It permits these operations to be carried out quickly and easily even when panchromatic film is being used so that the work must be done in complete darkness. Moreover, this mechanism still further cheapens and simplifies construction, especially since in the form shown by Figures 37 and 38 literally speaking all of the critical and moving parts are mounted upon one member which is completely interior to the magazine as a whole.

A chassis member 611 is mounted upon a bottom plate 612 having short upstanding sides 613. This one chassis member as seen in Figures 37 and 38 carries all of the film moving and film contacting parts of the magazine. It may well be held in position by a spring 615, engaging lugs 616 and 617 upturned from the chassis plate. The rear end of this spring bears against both a short side 613 of the bottom member of the magazine housing and a relatively long depending side 619 of a cover member 620. Alternatively the chassis plate may be riveted or spot welded into position. Locking lugs 621 upstanding from the chassis plate engage protuberances 622 which are formed in the flanges of the bottom plate and also, not shown, in the depending sides of the cover member.

A fixed apertured gate member 631 embodying a forwardly facing positioning lug 632 and a backwardly extending offset mounting portion 633 is formed and mounted as previously described. This positioning lug extends freely forwardly through an appropriate opening through the front edge of the magazine and is ground so that it accurately determines the focal plane of the film *f*. Alternatively a positioning lug may be formed upon the chassis member. A presser member 635 includes edge guides 636 and 637 and a rearwardly extending positioning and finger piece 638 constructed as previously described. The presser member may be held in position and resiliently urged forwardly by a multi-purposed spring 641 having two forwardly extending protuberances 642 and 643 bearing against the rearward or rightward side of the presser member, a delivery tensioning portion 646 and a take-up tensioning portion 647. This spring may be held in position by two upstanding lugs 650 and 651 struck from a forward offset portion 652 of the chassis member. Two upstanding lugs 656 and 657 limit the inward movement of the two tensioning members. As will readily be understood by a comparison of previous figures herein this structure resembles that previously described.

A take-up core 660 is driven from a compound gear 661 having the construction and characteristics of those previously shown as for example in Figure 9. This compound gear includes an inner member 663 which is engaged and driven by a gear 664 of the camera. External to this gear and attached thereto or made as a part thereof is a spur gear 665 which engages a spur gear 666 mounted upon a pin 667 in an upwardly extending offset portion 668 of the chassis member. This gear drives gear 669 which through another spur gear not shown and an appropriate take-up clutch such as those previously described in connection with Figures 12 and 13 drives a take-up roll or mass. Means not shown for blocking a delivery core 672 and the entire drive may be employed. This compound gear 661 is extended upwardly as shown in Figure 38 in the form of a shaft 674 which at its upward extremity has attached to it a single toothed gear 675. Up to this point the construction of this embodiment of our invention follows that previously described herein but from this point forwardly it differs from that previously presented herein as well as from the prior art known to us.

A swinging meter support plate or strap 680 is pivoted upon a collar 681 formed upon a tube or cylinder 682 which surrounds shaft 674. Alternatively this collar may be formed upon and from the plate. Or, if desired, this plate may be pivoted directly upon the shaft 674. It is this pivoted plate which supports all of the remaining driving elements of the meter and those which record the amount of film which has been fed or is to be fed.

The motion transmitting members for the footage indicator include a compound gear generally indicated as 685 mounted upon pin 686 mounted in the movable plate for movement therewith and rotation relatively thereto. A lower element 687 of this compound gear is in the form of a spur gear which is driven by the single tooth 675 while an upper portion 689 in turn is in the form of a single tooth which engages and drives a relatively large indicating spur gear 690 which is mounted for rotation with and relatively to a pin 691 which is mounted in swinging plate 680. Spring 692 furnishes the necessary slippage so that this gear may be readily reset.

Revoluble with gear 690 is an indicating plate 694 which is visible through a window 696 (Figure 37) and carries indicia indicating the amount of film which has been shown or remains to be shown. A resetting lug 698 projects beyond the surface of the spur gear. By reason of this construction it will be seen that revolution of compound gear 663 under the impulse of gear 664 of the apparatus will positively drive the indicating plate 694 and show clearly the amount of film which has been used or remains.

It will be noted that plate 680 at all times when the meter is operative extends over a portion of the film on either the delivery or the take-up roll and at times upon both. Consequently in order to give access to the film to remove one roll and substitute another this plate and the mechanism carried thereby as previously stated swings upon collar 681 as a pivot. It is guided and supported by a long slender pin 701 attached to the plate and extending downwardly therefrom to a slot 702 which is cut in chassis plate 681. A head 703 engages the under side of the chassis plate. By reason of this construction it will be seen that this plate may be swung so that access may be had at any time to the film. To hold it in its operative position a simple spring latch 704 attached for convenience to the rightward end of fixed apertured gate plate 631 coacts with an appropriate notch 705 in the rightward end of the swinging plate as observed in Figure 38.

This swinging plate is also useful since it forms an appropriate guide for the edge of the film and prevents it from moving out of its correct lateral position.

The foregoing description covers that phase of this embodiment of our invention which is illustrated in Figures 37 and 38 wherein the bridge or strap 680 which carries the recording portions of our metering device is mounted upon a chassis plate 668. Figure 39, likewise appearing upon Sheet 9, illustrates that phase of this embodiment wherein a chassis plate is omitted and this bridge is carried directly upon the bottom plate of a magazine housing.

Such bottom plate 714 is formed with an offset embossing 715 corresponding to the embossing 668 of chassis plate 611 as shown in Figures 37 and 38. Below this embossing and parallel thereto a cover plate 716 is applied which cooperates with the embossing to form a housing, narrow in its rightward portion as viewed in Figure 39, which encloses the driving gears for the magazine. This bottom plate is formed with an opening 717 to permit coaction between the driving gear of a camera and a motion transmitting train of the magazine.

Aside from the fact that the bridge in this form of our invention swings on a guiding post which is disposed for movement in an arcuate slot in this embossing, this phase of our invention is very closely similar to that which has been described immediately above. Therefore instead of describing it in detail we have applied to the parts of Figure 39 the same reference characters as those applied to similar parts in Figure 38 with 100 added to each thereof. Thus, bridge 780 of Figure 39 rotatable upon collar 782 corresponds to bridge 680 rotatable upon collar 682. In the structure of Figure 38 including a chassis this bridge is guided by post 701 with a lower collar 703 operating in an arcuate slot in the embossing in the chassis plate. In the structure of Figure 39 bridge 780 in its rotation is guided by post 801 having a collar 803 movable in an arcuate slot of the corresponding embossing of the bottom plate of the magazine.

From the above illustration of the correspondence between the two figures we believe that the operation of this phase of this embodiment of our invention will be clear without further description and merely by reference to the immediately preceding portion of this specification.

Throughout the foregoing specification we have made frequent reference to the ease of servicing a magazine, and a film mounted therein, constructed according to this invention. By "servicing" we mean not only the removal of an exposed or projected film from a magazine and the substitution of a fresh film but also the necessary checking of the static and moving parts and whatever adjustment may be necessary. This servicing as applied to certain other magazines has proved difficult and expensive and has required the use of intricate gauges and dies and the services of skilled workmen. Among the major advantages of this invention is that a magazine built according to this application when it comes in from the field may be prepared for effective use again with a minimum expenditure of time, trouble and skill.

Other advantages of our invention will have been made apparent from the foregoing portion of this specification, the attached drawings and the sub-joined claims. They include the provision of a simple, inexpensive and efficient structure in which the focal plane is accurately established and feeding carried out with a minimum risk of film jamming or breaking and the amount of film which has been or remains to be fed indicated positively and simply.

We claim:
1. In a film magazine, an outer protective casing and an inner main support movable rela- tively to said casing therewithin, a delivery support, a take-up support, said delivery and take-up supports being mounted upon said main support and movable therewith, a guide, said guide also being mounted upon said main support and movable therewith and being adapted to direct the film as it passes from said delivery support to said take-up support and to determine its focal plane, and resilient means connecting said casing and said main support for bodily moving said main support and the film and the elements mounted thereupon relatively to said casing.

2. In a film magazine, an outer protective casing having parallel top and bottom walls joined in spaced parallelism by side or edge walls, one of said edge walls being formed with a film exposing aperture, a chassis plate disposed within said casing parallel to the bottom wall thereof and movable relatively to said casing, a support for a delivery mass of film, a support for take-up mass of the film, said supports being mounted upon said chassis plate for movement therewith, a gate mounted upon said chassis plate for movement therewith adjacent said aperture in said edge wall, said supports and said gate being so disposed that the film passes from said delivery support through said gate to said take-up support, and resilient means engaging said chassis plate and said casing for bodily moving said chassis plate and the film and the said parts supported thereby in relation to said exposure aperture.

3. A film magazine comprising an outer protective casing which is substantially rectangular in cross section, a chassis plate adapted to be placed within said container and readily removed therefrom and when within said casing to move therewithin relatively thereto adjacent one of the walls of said casing, one wall of said casing at right angles to said above mentioned wall being formed with a film exposing aperture, means mounted upon said chassis plate for supporting a film and guiding it past said aperture adjacent thereto and determining is focal plane when said plate is disposed within said casing, and a spring engaging both said casing and said chassis plate for moving said chassis plate and the film supported and guided thereby toward said aperture.

4. In a film magazine generally rectangular in cross section and having top and bottom walls held in spaced parallelism to each other by edge walls with one of said edge walls being apertured, a chassis plate adapted to be bodily inserted within said magazine and to be disposed adjacent said bottom wall for slight movement parallel thereto, a support for a delivery mass of film upon said chassis, a support for a take-up mass of film upon said chassis, means upon said chassis for guiding the film from said delivery to said take-up mass past said aperture and for determining its focal plane, and a spring between the edge of said chassis plate relatively remote from the aperture but parallel thereto and the adjacent edge wall for forcing said chassis plate and the elements and film supported thereby toward said apertured wall.

5. In a film magazine having top and bottom walls held in spaced parallelism to each other by edge walls with one of said edge walls being apertured, a chassis plate adapted to be bodily inserted within said magazine and to be disposed adjacent said bottom wall for slight movement parallel thereto, a support for a delivery mass of film upon said chassis, a support for a take-up mass of film upon said chassis, means upon said chassis for guiding the film from said delivery to said take-up mass past said aperture and for determining its focal plane, a support extending from said chassis plate away from said bottom wall toward said top wall, and a spring co-acting with said support and with the adjacent edge wall of the magazine parallel to said edge wall having said aperture for forcing said chassis plate and the elements and film supported thereby toward said aperture.

6. In a film magazine having top and bottom walls held in spaced parallelism to each other by edge walls with one of said edge walls being apertured, a chassis plate adapted to be bodily inserted within said magazine and to be disposed adjacent said bottom wall for slight movement parallel thereto, a support for a delivery mass of film upon said chassis, a support for a take-up mass of film upon said chassis, means upon said chassis for guiding the film from said delivery to said take-up mass past said aperture and for determining its focal plane, at least one portion of the edge of said plate relatively distant from said aperture and in line therewith being turned upwardly away from said bottom wall toward said top wall at right angles thereto, and a spring engaging said upwardly extending formation and the edge wall of said magazine parallel to said apertured edge wall for forcing said chassis plate and the elements and film carried thereby toward said aperture.

7. In a film magazine including an outer casing having a top wall and a bottom wall held in spaced parallelism to each other by edge walls, an aperture being formed in one of said edge walls, a chassis plate disposed within said container adjacent and parallel to said bottom wall and movable therealong, a plurality of film supporting and guiding means, said means being mounted upon said chassis plate for movement therewith, two horizontally spaced portions of the edge of said chassis plate relatively distant from said aperture being turned upwardly away from said bottom toward said top wall at right angles thereto, each of said upward extensions including a socket, and a leaf spring, said leaf spring being formed with a tongue for disposal within each of said sockets, the central portion of said spring extending away from said extensions and engaging the edge wall of said magazine opposite said apertured edge wall for forcing said chassis plate and the elements carried thereby toward said aperture.

8. A film magazine for use with a film handling apparatus comprising an outer protective casing with top and bottom walls supported by edge walls in spaced parallelism to each other, a chassis plate adapted to be placed within said casing and readily removed therefrom and when within said casing to move therewithin relatively thereto adjacent the bottom wall of said casing, one of the edge walls of said casing being formed with a film exposing aperture, means mounted upon said chassis plate for supporting a film and guiding it past said aperture adjacent thereto and for determining its focal plane, a spring engaging both said casing and said chassis plate for moving said chassis plate and the film supported thereby toward said aperture, and means movable with said chassis plate and attached thereto adjacent the edge thereof which when said plate is disposed within said casing is relatively adjacent said opening which is adapted to coact with a fixed part of said apparatus when the magazine is disposed therein for positioning said chassis plate and the film supported and guided by said elements mounted therein for moving said plate against the power of said spring.

9. In a substantially rectangular film magazine for use with a film-handling apparatus, an outer protective casing one of the edge walls of which is apertured, a supporting chassis plate disposed within said casing parallel to and adjacent a wall which extends at right angles from said apertured wall, resilient means for bodily moving said chassis plate toward said apertured wall along said adjacent wall, a gate member mounted upon said chassis plate for movement therewith and disposed in line with the aperture of said edge wall, and means within said casing for supporting a film which passes said gate member.

10. In a substantially rectangular film magazine for use with a film-handling apparatus which includes a magazine-receiving compartment, an outer protective casing one of the edge walls of which is apertured, a gate member disposed adjacent and parallel to the apertured wall of said magazine in line with the aperture of said wall, a lug rigidly connected with said gate member and extending forwardly from the interior of said casing through an opening in said wall, said wall being provided with such an opening, and being adapted to contact a wall of said compartment while said magazine is disposed therein, a support for said gate member, said support including a surface extending backwardly from said apertured wall parallel to and adjacent a wall of the magazine disposed at right angles to said apertured wall and freely movable in relation thereto, and a spring extending from an edge of said support relatively distant and parallel to the edge relatively adjacent said apertured wall and engaging an edge wall of said magazine for forcing said support and hence said gate member forwardly, said lug thereby engaging a wall of said magazine-receiving compartment and said gate member being positioned thereby.

11. In a substantially rectangular film magazine for use with a film-handling apparatus which includes a magazine-receiving compartment, a gate member disposed adjacent and parallel to the apertured wall of said magazine, a support for said gate member, said support including a surface extending backwardly from said apertured wall parallel to and adjacent a wall of the magazine disposed at right angles to said apertured wall and freely movable in relation thereto, a lug extending forwardly from said support through an opening in said apertured wall, said wall being provided with such an opening, a spring extending from said support and engaging a wall of said magazine for forcing said support and hence said apertured member forwardly, said lug thereby engaging a wall of said magazine-receiving compartment and being positioned thereby, and a resilient presser member bodily movable with said support and adapted to hold a film against said gate member.

12. In a magazine for use with a film-handling apparatus which includes a magazine-receiving compartment, an outer protective casing including a top wall and a bottom wall joined by side walls at right angles thereto, one of said side walls being formed with an aperture, an apertured gate member disposed parallel to and adjacent said apertured wall, the apertures of said member and said wall being in line, a movable support for said apertured gate member extending therefrom at right angles thereto adjacent said bottom wall, a multi-purposed spring mounted upon said movable support, a presser member which is adapted to be disposed parallel to said apertured member for establishing the side of a film channel other than that established by said apertured member, means for detachably connecting said spring and said support, said spring being of such contour that at least one portion thereof engages the side of said presser member opposite that which establishes said film channel for pressing it toward said apertured member, said spring extending above and below said gate and engaging the film as it travels therethrough to condition its movement, and means attached to said support and adapted to cooperate with said compartment when the magazine is disposed therein for determining the relative position of said support and hence of said member.

13. In a magazine for use in a film handling apparatus having a magazine-receiving compartment, said magazine including a casing having top and bottom walls held in spaced parallelism to each other by edge walls, one of said edge walls being apertured, said magazine including a movable chassis plate disposed adjacent said bottom wall, a delivery support and a take-up support between which a film travels, a fixed gate member for establishing the focal plane of the film, said supports and said gate member being mounted upon said chassis plate for movement therewith, the film as it travels between said supports engaging said gate member, said gate member being disposed adjacent said apertured edge wall of said magazine and in line with the aperture thereof, a lug extending forwardly from said gate member away from the film through an opening in said casing and when said magazine is within said magazine-receiving compartment engaging a portion thereof, said casing being supplied with such an opening, a presser gate member parallel to said fixed gate member and engaging the film as it travels from said delivery support to said take-up support thereby completing the film channel, and a multi-purposed spring detachably connected to said chassis plate at right angles thereto, said multi-purposed spring including at least one portion shaped to engage the side of said presser gate member opposite to that engaging the film and having another and curvilinear portion engaging the film between said delivery support and the relatively adjacent end of said gate and having still another curvilinear portion engaging the film between the opposite end of said gate and said delivery support, said curvilinear film-engaging portions being adapted to condition the movement of the film as it passes between said supports through said gate.

14. In a film magazine, an outer casing having a top wall and a bottom wall and edge walls which hold said top and bottom walls in spaced parallelism to each other, said edge walls being curved where they join each other and a front of said edge walls having an aperture, a chassis plate disposed within said casing parallel to said bottom wall, a front portion of said chassis plate relatively adjacent said wall being offset first at right angles and then in a plane parallel to the plane of the principal surface of said chassis member and forming a forwardly-facing extension, a fixed gate section, said fixed section comprising an apertured central portion and curvilinear portions disposed at each side of said aperture, the aperture of said gate section being in line with that of said front wall and said curvilinear portions conforming to the contour of said front wall and the edge walls adjacent thereto and forming one side of a channel through which a film is fed, an extension projecting backwardly from said fixed gate section and away from said apertured front wall and at right angles to the film-engaging surface thereof and adapted to project between said forwardly facing extension of said chassis plate and the inside surface of said bottom wall whereby said fixed gate section and said chassis member may be attached one to the other, a presser section for disposal opposite and parallel to said central portion of said fixed gate section for establishing the other side of the film channel, a spring for impelling said presser section toward said fixed gate section, said spring engaging the side of said presser section other than that establishing one side of said film channel, and means for maintaining said spring in operative relation to said presser section.

15. In a film magazine, an outer casing having a top wall and a bottom wall and edge walls which hold said top and bottom walls in spaced parallelism to each other, a front of said edge walls having an aperture, a chassis plate disposed within said casing parallel to said bottom wall, a front portion of said chassis plate relatively adjacent said front wall being offset in a plane parallel to the plane of the principal surface of said chassis plate and forming a forwardly facing extension, a fixed gate section for establishing one side of a channel through which a film is fed, an extension projecting backwardly from said fixed gate section and away from said apertured front wall and at right angles to the film-engaging surface thereof and adapted to project between said forwardly facing extension of said chassis plate and the inside surface of said bottom wall whereby said fixed gate section and said chassis plate may be held in predetermined relation to each other, a presser gate section for disposal opposite and parallel to said fixed gate section for establishing the other side of the film channel, spring means for impelling said presser section toward said fixed gate section, and a support for said spring means extending from said chassis plate away from said bottom wall.

16. A film magazine comprising an outer protective casing and an inner chassis plate, said casing having top and bottom walls joined in spaced parallelism by edge walls at right angles thereto, one of said edge walls being formed with an exposure aperture, said inner chassis plate being of the general shape and approximate size of said bottom wall and disposed adjacent and parallel thereto, the portion of said chassis plate adjacent said aperture when said chassis plate is within said container being offset upwardly from the bottom wall of said container and then continued forwardly toward said apertured wall and parallel to said bottom wall, and a unitary fixed gate member, said unitary member having a film engaging surface and a positioning surface, said film engaging surface being disposed at right angles to said film engaging surface and being adapted for disposition between said offset portion of said chassis member and the plane of the major surface thereof, and means for attaching said right-angled positioning portion and said offset portion whereby said film-engaging portion of said fixed gate is disposed at right angles to the plane of said chassis plate and adjacent said aperture.

17. In a film magazine including an outer casing with top and bottom walls maintained in spaced parallelism by edge walls, one of which is apertured, a supporting chassis plate disposed adjacent said bottom plate, a portion of said chassis plate relatively adjacent said apertured edge wall being offset first upwardly and then forwardly in a plane parallel to said bottom plate and slightly thereabove to form a supporting lip, at least one projection extending upwardly from said chassis plate at substantially a right angle thereto and adjacent said apertured edge wall, a fixed gate plate having a film engaging surface and a supporting surface at right angles thereto, said supporting surface passing between said chassis plate and said forwardly extending lip and being attached rigidly thereto, a presser plate having a film engaging surface disposable opposite to said film engaging surface of said fixed plate, and a spring supported by said projection and bearing against the surface of said presser plate opposite that engaging the film.

18. In a film magazine including an outer casing with top and bottom walls maintained in space parallelism by edge walls, one of which is apertured, a supporting chassis plate disposed adjacent said bottom plate, a portion of said chassis plate relatively adjacent said apertured edge wall being offset first upwardly and then forwardly in a plane parallel to said bottom plate and slightly thereabove to form a supporting lip, at least one projection extending upwardly from said chassis plate at substantially a right angle thereto and adjacent said apertured edge wall, a fixed gate plate having a film engaging surface and a supporting surface at right angles thereto, said supporting surface passing between said chassis plate and said forwardly extending lip and being attached rigidly thereto, a presser plate having a film engaging surface disposable opposite to said film engaging surface of said fixed plate, a spring supported by said projection and bearing against the surface of said presser plate opposite that engaging the film, said spring being extended upon each side of said presser plate into engagement with the film for guiding it and conditioning its movement, and a projection extending upwardly from said chassis plate into engagement with the side of each of said extensions of said spring other than those engaging the film for limiting the movement thereof.

19. In a film magazine including an outer casing with top and bottom walls maintained in space parallelism by edge walls, one of which is apertured, a supporting chassis plate disposed adjacent said bottom plate, a portion of said chassis plate relatively adjacent said apertured edge wall being offset first upwardly and then forwardly in a plane parallel to said bottom wall and slightly thereabove to form a lip, at least one projection extending upwardly from said chassis plate at substantially a right angle thereto and adjacent said apertured edge wall, a fixed gate plate having a film engaging surface and a supporting surface at right angles thereto, said supporting surface passing between said chassis plate and said offset forwardly extending lip and being attached rigidly thereto, a presser plate having a film engaging surface disposable opposite to said film engaging surface of said fixed plate, and a spring supported by said projection or projections and bearing against the surface of said presser plate opposite that engaging the film.

20. In a film magazine for use in a film handling apparatus having a magazine receiving compartment, said magazine having relatively broad top and bottom walls held in space parallelism by relatively narrow edge walls, one of said edge walls being apertured, a movable gate plate for establishing the focal plane of a film supported by said magazine, said gate plate being in line with the aperture of said edge wall, a support for said gate plate extending backwardly away from said edge wall adjacent one of said broad walls, a pin and slot connection between said support and said broad wall, a spring engaging said support and a wall of said casing for forcing said support and hence said gate plate toward said apertured edge wall, and a lug extending from said gate plate through an opening in said apertured edge wall and into contact with a fixed part of said magazine receiving compartment thereby positioning said support and said fixed gate section.

21. In a film magazine for use in a film handling apparatus having a magazine receiving compartment, said magazine having relatively broad top and bottom walls held in space parallelism by relatively narrow edge walls, one of said edge walls being apertured, a movable gate plate for establishing the focal plane of a film supported by said magazine, said gate plate being in line with the aperture of said edge wall, a support for said gate plate extending backwardly away from said edge wall adjacent one of said broad walls, a pin and slot connection between said support and said broad wall, a guiding surface parallel to said support and said wall for maintaining said support in parallel relation to said wall as it moves, a spring engaging said support and a wall of said casing for forcing said support and hence said gate plate toward said apertured edge wall, and a lug extending from said gate plate through an opening in said apertured edge wall and into contact with a fixed part of said magazine receiving compartment thereby positioning said support and said fixed gate section.

22. In a film magazine for use in a film handling apparatus having a magazine receiving compartment and a lens, said magazine having an apertured edge wall, means for supporting a film therewithin, a relatively fixed but adjustable gate member disposed within said casing for establishing the focal plane of the film as it passes the aperture of said wall, a support for said gate member, a rotatable adjusting member having a cam surface engaging an edge of said support, the rotation of said adjusting member operating said cam surface for moving said fixed gate section, a projection from said fixed gate section extending through an opening in said apertured edge wall of said casing for engaging a fixed surface of said magazine receiving compartment thereby establishing said gate member in the focal plane of said lens as said cam surface is moved, said wall being formed with such an opening, and means for maintaining said projection in operative relation to said fixed surface.

23. A gate for use in a film handling device, said gate comprising a fixed plate and a movable presser plate which embody adjacent film-engaging parallel surfaces which establish a film channel, at least one of said plates being apertured, one of said plates having at least one projection extending from an edge thereof at right angles to its film-engaging surface toward said other plate and bounding one edge of said channel, said other plate having a guiding opening for receiving said projection, a support for the edge of said movable plate other than that adjacent said projection upon which said movable plate is freely movable, and a spring for holding said movable plate in operative relation to said other plate and a film therebetween, said projection serving both as an edge guide for the film and a retaining and positioning member for the movable pressure plate.

24. A gate for use in a film handling apparatus, said gate comprising a relatively fixed plate and a presser plate cooperating therewith, said plates being parallel and each establishing one side of a path through which film is fed, one or a first of said plates comprising a flat surface engaging one side of the film thereby establishing one side of said channel and having at least one edge portion projecting toward said the other or second of said plates at one side of said channel and fitting within a notch therein, said second plate being provided with such a notch, whereby one of said plates is supported by the other of said plates and an edge guide provided for the film channel.

25. A presser plate for use in a gate for a film handling device; said gate also including a relatively fixed plate and means for resiliently moving said presser plate towards said apertured plate; said presser plate being relatively movable in relation to said fixed plate and being disposed parallel thereto for establishing a channel for a film therebetween, said presser plate being formed of a single piece of material at least one edge portion of which projects toward said fixed plate at right angles to each of said plates for defining an edge of the film channel and another portion of which is extended in the other direction away from said fixed plate and said film channel for furnishing a finger hold by which said presser plate may be moved against the power of said resilient means in a direction away from said fixed plate and a film therebetween.

26. For use in a film magazine having an outer protective casing, said casing comprising a top wall and a bottom wall and edge walls for maintaining said top and bottom walls in spaced parallelism and a fixed gate plate adjacent at least one of said edge walls and extending from a point adjacent said bottom wall to a point adjacent said top wall and forming one side of a channel through which a film is fed; a presser plate, said presser plate being adapted to be disposed parallel to said fixed plate and of substantially the same width for establishing the other side of said channel, said presser plate having a formation extending from one edge thereof in a direction away from said fixed plate and away from said bottom wall and so dimensioned and disposed as to bear against the inside surface of said top wall to hold said presser plate against movement in a direction away from said bottom wall; and spring means for impelling said presser plate toward said fixed apertured member.

27. In a film magazine, an outer protective casing having a top wall and a bottom wall and edge walls which hold said top and bottom walls in spaced parallelism to each other, one of said edge walls having an exposure aperture, a fixed gate plate disposed in line with said aperture and adjacent at least one of said edge walls, said gate plate having a flat film-engaging surface and conforming to its contour, a presser gate plate disposed parallel and adjacent to said fixed gate plate, spring means for pressing said presser plate toward said fixed plate and a film therebetween, said presser plate having a flat film-engaging surface parallel to that of said fixed plate and cooperating therewith to form the sides of a film channel, at least one lug extending from an edge of said presser plate toward said fixed plate for establishing the edge of said film channel opposite that established by said right-angled extension, and a finger-hold extending from said last mentioned edge of said presser plate in a direction opposite that in which said lug extends and so disposed that it bears against said top wall of said casing whereby said presser member is maintained against movement in a direction parallel to said film channel away from said bottom wall.

28. In a film magazine having top and bottom walls held in spaced parallelism to each other by edge walls, one of said edge walls of said magazine being apertured, a relatively fixed apertured gate plate being disposed parallel to and adjacent said front wall within said magazine, said apertures being in line, a multi-purposed leaf spring disposed opposite and parallel to said apertured plate and engaging the side of the film opposite that engaged by said apertured plate, said spring thereby serving as a presser member, two supports extending at right angles to said bottom wall, one relatively adjacent one end and one relatively adjacent the other end of said gate, the arc of the leaf spring as it freely extends between said supports being flattened when it is positioned against said apertured gate plate in its central portion, said leaf spring extending from each of said supports away from said gate and being free at each end and engaging the film in order to guide it to and from said gate and condition its movement, said spring thereby furnishing one entire side of the channel for the film within said magazine.

29. A gate for use in a film handling device, said gate comprising a relatively fixed member and a presser member disposed parallel thereto and engaging the side of the film opposite that engaged by said fixed member, said presser member being formed by a central portion of a multi-purposed leaf spring, said leaf spring extending in each direction away from said fixed gate member and engaging the film before it enters and after it leaves said gate for guiding the film and conditioning its movement, and two supports for said spring, one being disposed upon one side of said gate and the other being disposed upon the other side of said gate and spaced therefrom, the distance between said supports being less than the distance along the surface of said spring while said spring is out of contact with said other gate member whereby when said spring is attached to said supports its central portion is flattened, and a bayonet lock for connecting each of said supports and said spring whereby said spring may be quickly mounted upon and removed from said supports, resilience being given thereto by the portions of said spring between each of said supports and said apertured gate member.

30. In a film magazine, an outer protective casing having a top wall and a bottom wall and edge walls which hold said top and bottom walls in spaced parallelism to each other, one of said edge walls having an exposure aperture, a fixed gate member disposed adjacent at least one of said edge walls and conforming to its contour, said fixed gate member having an extension at right angles to its film-engaging surface and parallel to and adjacent said bottom wall of the magazine whereby said fixed section is affixed thereto, a presser gate member disposed parallel and adjacent to said fixed gate member, spring means for pressing said presser member toward said apertured member and a film therebetween, said fixed member and said presser member having parallel film-engaging surfaces which form the sides of a film channel, one edge of said channel being formed by said right-angled extension, at least one lug extending from an edge of said presser member toward said fixed member for establishing the opposite edge of said film channel, and a projection extending from said edge of said presser member in a direction opposite that in which said lug extends and so disposed that it bears against the top of said casing whereby said presser member is maintained against movement in a direction normal to the line of travel of the film therealong and parallel to its plane.

31. In a film magazine, an outer protective casing, said casing comprising a top wall and a bottom wall and edge walls for maintaining said top and bottom walls in spaced parallelism, a fixed gate plate adjacent at least one of said edge walls and extending from a point adjacent said bottom wall to a point adjacent said top wall and forming one side of a channel through which a film is fed, a presser plate disposed parallel to said fixed plate and of substantially the same width for establishing the other side of said channel, spring means for impelling said presser plate toward said fixed plate, and a formation extending from one edge of said presser plate in a direction away from said fixed plate and so disposed as to bear against the inside surface of said top wall to hold said presser plate against movement in a direction parallel to said film channel away from said bottom wall.

32. In a film gate for a film handling device, two sections parallel to each other for establishing the sides of a film channel, one or a bottom edge of said channel being established by a fixed surface and a removable edge guide for establishing the opposite or top edge of said channel, said edge guide being in the form of a leaf spring one end of which is mounted relatively adjacent the surface forming said first edge guide and extending therefrom generally parallel to but slightly spaced backwardly from said gate sections to a point opposite the top edge of said gate and thereupon extending forwardly and toward and beyond the edge of said gate thereby forming a guide for the second edge of the film, the resilience of said portion of said spring parallel to said gate sections permitting a user to pull said edge guide away from said gate thereby securing free access to the second or top edge thereof.

33. In a film gate for a film handling device, two gate plates parallel to each other for establishing the sides of a film channel, one or a bottom edge of said channel being established by a fixed surface and a removable edge guide for establishing the opposite or top edge of said channel, said edge guide being in the form of a leaf spring, a socket with walls parallel to and adjacent the plane of said fixed surface, one end of said spring being turned at an angle to the body thereof and adapted to be disposed in said socket, and the body of said spring extending therefrom generally parallel to but slightly spaced from said gate plates rearwardly thereof to a point opposite the top edge of said gate and thereupon extending forwardly and toward and beyond the edge of said gate thereby forming a guide for the second or top edge of the film, the resilience of said body portion of said spring permitting a user to pull said edge guide away from said gate thereby securing free access to the second edge of the film.

34. In a film magazine, an outer protective casing having a top wall and a bottom wall held in spaced parallelism to each other by edge walls, a chassis plate for disposal within said magazine adjacent and parallel to said bottom wall but slightly spaced therefrom, a take-up support mounted upon said chassis plate upon the inside thereof, gearing for driving said take-up support mounted upon said chassis plate between said plate and said bottom wall, said chassis plate being formed with an inwardly-extending recess, said bottom wall opposite said recess being formed with an opening to give access thereto, a main motion-receiving gear mounted upon said chassis member within said recess, and a bell shaped gear surrounding said main gear and attached thereto and driven therewith and having teeth which engage and drive said take-up gearing.

35. A film magazine comprising an outer protective casing substantially rectangular in form and having top and bottom walls held in spaced parallelism by edge walls and an inner chassis plate, said chassis plate being of a size and shape to fit compactly adjacent said bottom wall of said casing therewithin, a delivery support, a take-up support, a gate, said support and said gate being mounted upon said chassis plate and extending therefrom toward said top wall of said casing and being bodily movable with said plate and said take-up support having a motion-receiving member projecting through said chassis plate to the side thereof adjacent said bottom wall, a drive for said take-up, said drive being mounted upon said bottom wall and having a motion-transmitting member so disposed that when said chassis plate is placed within said casing it operatively engages said motion-receiving member thereby driving said take-up support.

36. In a film handling device, a hollow film-supporting core, an annular slot in the inside of said core, an S-shaped leaf spring the ends of which bear against the bottom of said slot, a stub shaft disposed within said core and free of contact therewith, said stub shaft having a transverse slot at the top thereof wherein said S-shaped spring is mounted, a supporting plate, a take-up shaft mounted for revolution in said plate, a disk mounted upon and revoluble with said shaft and disposed adjacent one side of said plate and parallel thereto, said stub shaft being mounted in the upper end of said take-up shaft, the top of said take-up shaft and the bottom of said stub shaft having cooperating formations whereby said take-up shaft revolves said stub shaft, a gear upon said take-up member disposed parallel to said plate and adjacent the side thereof other than that adjacent which said disk is mounted, and means for driving said gear thereby frictionally revolving said core and the film supported thereby.

37. In a film handling device, a hollow revoluble take-up core adapted to support and wind up a film upon the outside thereof, a revoluble spring engaging the interior of said core, the interior of said core and said spring embodying instrumentalities whereby said spring both supports said core and frictionally revolves it, and a revoluble drive extending to the inside of said core and free of contact therewith for both supporting said spring and driving it.

38. In a film handling device, a hollow take-up core adapted to support and wind up a film mounted upon the outside thereof, a single leaf spring having curved ends, each of which bears against the inside of said core for frictionally revolving said core, a revoluble drive extending to the inside of said core and free of contact therewith for both supporting said spring and driving it, and means for applying power to said revoluble drive whereby the film is frictionally wound up.

39. In a film handling device, a hollow core adapted to support and wind up a film upon the outside thereof, an annular slot being formed upon the inside of said core below the top thereof, spring means disposed within said slot bearing against the inner surface of said core, the edges of said slot and said spring means preventing substantial movement of said core in a direction parallel to the axis of said core, a support extending within said core and free of contact therewith for both supporting and revolving said spring means, and a drive for revolving said support in a winding-up direction whereby the film is frictionally wound upon said core.

40. In a film magazine, an outer protective casing including a top wall and a bottom wall held in spaced parallelism to each other by edge walls, a recess formed in said bottom wall which extends inwardly within said magazine, a gear disposed within said recess and accessible from the exterior of said magazine, a motion-transmitting member shaped to conform to the inside of the wall of said recess and having teeth formed in the portion thereof adjacent the junction of said recess and the bottom of said magazine, a connection between said member and said gear whereby the revolution of said gear drives said member, a take-up support, and a connection including a frictional element between said motion-transmitting member and said take-up support for revolving said support by the revolution of said member.

41. In a film magazine, an outer protective casing having a top wall and a bottom wall held in spaced parallelism to each other by edge walls, a chassis plate for disposal within said magazine adjacent and parallel to said bottom plate but slightly spaced therefrom, a take-up support mounted upon said chassis plate upon the inside thereof or upon the side thereof relatively distant from said bottom wall, gearing for driving said take-up support mounted upon said chassis plate between said plate and said bottom wall, said chassis plate being formed with an inwardly-extending recess, an opening in said bottom wall opposite said recess to give access thereto, a gear mounted upon said chassis plate within said recess, and a motion-transmitting connection between said gear and said take-up gearing.

42. In a film magazine, an outer protective casing having a top wall and a bottom wall held in spaced parallelism to each other by edge walls, a chassis plate for disposal within said magazine adjacent and parallel to said bottom plate but slightly spaced therefrom, a take-up support mounted upon said chassis plate upon the inside thereof, gearing for driving said take-up support mounted upon said chassis plate between said plate and said bottom wall, said chassis plate being formed with an inwardly-extending recess, an opening in said bottom wall opposite said recess to give access thereto, a main motion-receiving gear mounted upon said chassis member within said recess, and a bell shaped gear surrounding said main gear and driven thereby and having teeth which engage and drive said take-up gearing.

43. In a film magazine, an outer protective casing, an inner chassis plate, and a plurality of film supporting and guiding members; said casing comprising a relatively flat bottom plate without sides rising a substantial distance therefrom and a flat top plate with sides depending therefrom at right angles thereto and extending a substantial distance and adapted to interfit with the edges of said bottom plate, said film guiding and supporting members being mounted solely upon said chassis plate, said chassis plate being disposed adjacent said bottom plate whereby when said top plate is removed from said bottom plate a film may be readily threaded upon said guiding and supporting members free from interference from the depending sides of said top plate, and means for detachably fastening said top and bottom plates together after a film has been threaded upon said chassis plate.

44. In a film magazine adapted for use with a film handling apparatus having a powered drive, an outer protective casing, an inner chassis plate, and a plurality of film supporting and guiding members including a revoluble delivery support and a revoluble take-up support; said casing comprising a relatively flat bottom plate without sides rising a substantial distance therefrom and a flat top plate with sides depending therefrom at right angles thereto and extending a substantial distance and adapted to interfit with the edges of said bottom plate, said film guiding and supporting members being mounted solely upon said chassis plate, a gear train adapted to be operated by the drive of the apparatus when the magazine is positioned therewithin for driving said take-up support, control means operatively interconnecting said train and said delivery support and containing instrumentalities for blocking the revolution of said delivery support and said gear train except when said magazine is positioned within said apparatus and said powered drive is operating said gear train, said chassis plate being disposed adjacent said bottom plate whereby when said top plate is removed from said bottom plate a film may be readily threaded upon said guiding and supporting members free from interference from the depending sides of said top plate, and means for detachably fastening said top and bottom plates together after a film has been threaded upon said chassis plate, said blocking means being effective to maintain said film from longitudinal movement and said supports from rotation while said chassis plate is without said container.

45. In a film magazine, an outer protective casing, an inner chassis plate, a revoluble delivery support and a revoluble take-up support and a guide therebetween all mounted upon said chassis plate for movement therewith, said chassis plate being bodily movable from and to a position within said casing whereby when it is out of said casing a film may be threaded from one of said supports to the other past said guide, and means mounted upon said chassis plate and bodily movable therewith for blocking the unwinding of at least one of said film supports while said chassis plate is outside of said casing.

46. Apparatus according to claim 45, said blocking means comprising a lock, said lock embodying a connection to said film support for preventing its rotation.

47. Apparatus according to claim 45, said blocking means comprising a locking member, said locking member embodying an operative connection with said support for preventing its rotation, and an actuating member operable from the exterior of said magazine when said chassis plate is disposed therewithin for rendering said lock ineffective.

48. Apparatus according to claim 45, said blocking means including a locking member one portion of which engages said delivery support for preventing its rotation and another portion of which is operable from the exterior of said casing after said chassis plate has been placed within said casing.

49. Apparatus according to claim 45, said apparatus including a drive within said casing for said take-up support and said blocking means including a locking member, said locking member embodying connections with said drive and with said delivery support which when operative disable said drive and hence said take-up member and prevent the revolution of said delivery support.

50. In a film magazine for use within a film handling apparatus having a source of power, a substantially rectangular casing comprising parallel top and bottom walls supported in spaced parallelism to each other by edge walls, a removable chassis member disposed adjacent said bottom wall and parallel thereto, a revoluble take-up support mounted upon said chassis plate and extending therefrom toward said top wall, a revoluble delivery support mounted upon said chassis plate and extending therefrom toward said top wall, a gear train mounted upon said chassis plate and removable therewith for driving said take-up support, a connection extending from said gear train to a position outside of said magazine whereby said driving means may be driven by the source of power within said apparatus when the magazine is mounted thereupon, and means for blocking the revolution of said take-up and said delivery supports mounted upon said chassis plate and removable therewith whereby when said chassis plate is out of said magazine said supports are irrevoluble.

51. In a film magazine, a substantially rectangular casing comprising parallel top and bottom walls supported in spaced parallelism to each other by edge walls, a chassis member disposed adjacent said bottom wall and parallel thereto, a revoluble take-up member mounted in said chassis plate and extending therefrom toward said top wall, a driving connection for said take-up member disposed upon the side of said chassis plate adjacent said bottom wall and therebetween, a revoluble delivery member mounted in said chassis plate and extending therefrom toward said top wall, and operable locking means disposed between said chassis plate and said bottom wall and operatively connected to said driving connection and said delivery member for blocking the operation of said connection and the revolution of said delivery member.

52. In a film magazine, a substantially rectangular casing comprising parallel top and bottom walls supported in spaced parallelism to each other by edge walls, a chassis member disposed adjacent said bottom wall and parallel thereto, a revoluble take-up support mounted in said chassis plate and extending therefrom toward said top wall, a driving connection for said take-up support disposed upon the side of said chassis plate adjacent said bottom wall and therebetween, a revoluble delivery support mounted in said chassis plate and extending therefrom toward said top wall, a connection with said delivery support extending to the other side of said chassis plate, a gear train for driving said driving connection of said take-up member in a normal or winding up direction disposed between said chassis plate and said adjacent bottom wall and supported by said chassis plate, a blocking dog disposed between said chassis plate and said bottom wall and mounted upon said chassis plate, said dog having a single tooth engaging a gear of said train and an oversized opening surrounding said delivery connection for blocking the revolution thereof, and a spring for moving said dog so that said tooth thereof is impelled contrary to the normal direction of rotation of said gear.

53. In a film magazine, a casing, said casing comprising a flat bottom plate with narrow upstanding flanges which at a plurality of points are extended upwardly or away from the flat body of said plate, a flat top plate with relatively long sides depending therefrom at right angles thereto and adapted to interfit both with said flanges, whereby a light seal is provided, and with said upstanding extensions of said flanges, whereby rigidity is secured, a plurality of film guiding and film supporting members, said members being disposed within said casing and mounted upon said bottom plate, and means for detachably securing said plates to each other, whereby a film may be serviced in relation to said film supporting and film guiding members without interference from the sides of a casing when said top plate is removed.

54. In a film magazine, an outer protective casing, a flat chassis plate, and a plurality of film guiding, supporting and moving means; said outer casing comprising a flat bottom plate without sides rising a substantial distance from the edges thereof and a flat top plate with sides depending therefrom a sufficient distance to inter-fit with the edges of said bottom plate, said chassis plate being disposed within said casing adjacent and parallel to said bottom plate, said film supporting and guiding means being mounted solely upon said chassis plate and disposed between it and the inside of said flat top plate and said film-moving means being mounted upon said chassis plate on the side thereof adjacent said bottom plate.

55. In a film magazine, an outer protective casing, a flat chassis plate, and a plurality of film guiding, supporting and driving means; said outer casing comprising a flat bottom plate without sides rising a substantial distance from the edges thereof and a flat top plate with sides depending a sufficient distance therefrom to inter-fit with the edges of said bottom plate, said chassis plate being adapted to be disposed within said casing adjacent and parallel to said bottom plate, and being adapted to be bodily removed from said casing, said film supporting and guiding means being mounted solely upon said chassis plate between it and the inside of said top member and said film driving means being mounted upon said bottom plate between it and the bottom of said chassis plate, a connection attached to one of said film supporting means and extending to a point between said chassis plate and said bottom plate where it can be engaged by said driving means when said chassis plate is disposed in said casing, and means for detachably connecting all of said plates together.

56. In a film magazine, a first single flat plate having extensions therefrom at right angles to the flat surface thereof at a plurality of widely spaced points, a delivery support disposed upon said first plate, a take-up support disposed upon said first plate, a guide disposed upon said first plate between said supports, a film passing from said delivery support past said guide and to said take-up support, a second flat plate with relatively long light proof sides depending therefrom at substantially a right angle thereto and adapted to interfit with said extensions, one of said sides being provided with an exposure aperture disposed in line with said guide, whereby a film mounted upon said support and passing said guide may be serviced without interference from the sides of a casing when said second plate is removed therefrom, and means for detachably connecting said sides and said extensions.

57. A film magazine comprising an outer protective casing and a single inner chassis plate, said chassis plate and the parts carried thereby being bodily movable to and from an operative position within said casing, said casing having a film exposure aperture and two supports for a film and a gate member therebetween, said supports and said gate being mounted solely upon said single plate for bodily movement therewith whereby a film may be readily threaded upon said chassis plate while it is without said container, readily operable locking means operatively inter-connecting said chassis plate and said casing for maintaining said chassis plate in operative position within said casing after it has been placed therewithin, said gate being so disposed upon said chassis plate and said chassis plate being of such size and shape that when said plate is disposed within said container and said interconnecting means is effective said gate is adjacent said aperture.

58. A film magazine comprising an outer protective casing and a chassis plate for use therewithin, said outer casing having top and bottom walls supported in spaced parallelism to each other by side or edge walls, and said chassis plate being of such size and shape that it is adapted to be placed relatively adjacent said bottom wall, spaced edge portions of said chassis plate being turned at right angles to the main surface of said chassis plate and hence parallel to the edge walls of said casing, certain of said formations so up-turned being adapted to engage said side walls to hold the parts of said casing rigidly together, certain of said formations being adapted to support a gate member disposed upon said chassis plate and certain others of said formations being adapted to operate as locks to keep said casing closed.

59. In a magazine adapted to protect a light sensitive film, an outer protective casing, said casing having relatively wide top and bottom walls held in spaced parallelism to each other by relatively narrow edge walls, means for supporting and guiding a light-sensitive film disposed within said casing, a locking member extending from an operative connection with one of said wide walls at right angles thereto toward the other of said wide walls adjacent one of said narrow walls, and a connection between said locking member and said wall adjacent thereto for holding said casing closed thereby preventing the fogging of said film by unauthorized opening of said casing.

60. In a film magazine, a substantially rectangular outer protective casing having parallel relatively long top and bottom walls held in spaced parallelism to each other by edge walls, means within said casing for supporting and guiding a light-sensitive film, certain of said edge walls being attached to one of said long sides and others being attached to the other thereof and over-lapping in order to provide a light seal and at least one of said overlapping edge walls being slightly resilient, cooperating detent formations extending between said edge wall where they overlap for holding said edge walls fixed to each other thereby locking said container, and instrumentalities whereby one of said overlapping edge walls may be moved slightly away from the other thereby freeing said detents and unlocking said container.

61. In a film magazine, an outer protective casing, said casing having top and bottom walls held in spaced parallelism to each other by edge walls, means for supporting and guiding a light-sensitive film disposed within said casing, a locking member extending from an operative connection with said bottom wall at right angles thereto toward said top wall adjacent one of said edge walls, a pin extending from said locking member through an adjacent edge wall attached to said top member for locking said top and bottom walls together, and means for displacing said pin so that said walls can be separated.

62. In a film magazine, an outer protective casing, said casing having a top wall and a bottom wall held together in spaced parallelism by edge walls, a chassis plate adapted for insertion within said magazine adjacent said bottom wall, said bottom wall being provided with upstanding flanges and said top wall being provided with downwardly extending edge walls which co-act with said flanges to form a light-tight casing, film supporting and film guiding means mounted upon said chassis plate, a locking formation extending upwardly from an edge of said chassis plate in a direction away from said bottom plate and adjacent and parallel to a depending edge wall of said top member, said locking formation and said depending edge wall having cooperating detent members which when said chassis plate is disposed upon said bottom wall locks said chassis plate to said top wall, and means for locking said chassis plate and said bottom wall together.

63. In a film magazine, an outer protective casing comprising relatively long top and bottom walls maintained in spaced parallelism to each other by relatively narrow edge walls, certain of said edge walls being attached to one of said long walls and others being attached to the other thereof and over-lapping so as to provide a light seal, at least one of said sets of over-lapping walls being slightly resilient, detent formations in said over-lapping walls which cooperate with each thereof where they over-lap thereby latching said walls together and locking said casing against unauthorized opening, said outer wall having an opening at a point adjacent said cooperating detents through which a tool may be introduced for forcing said inner wall away from said outer wall thereby freeing said detents and permitting the separation of the parts of said casing and access to the interior thereof.

64. In a film magazine, an outer protective casing, said casing having top and bottom walls maintained in spaced parallelism to each other by edge walls depending from and attached to said top wall, a chassis plate disposed within said casing adjacent the bottom wall thereof, members for supporting and guiding a light-sensitive film, said members being mounted upon said chassis plate, a first means for locking said chassis plate to said bottom wall, and a second and separate means for locking said chassis plate to said top wall whereby said casing as a whole is locked and unauthorized access to said light-sensitive film is prevented and said top wall with its depending side walls may be removed after said first means has been unlocked for the authorized serving of the film without interference from said side walls or disturbing the connection between said bottom wall and said chassis plate.

65. In a film magazine, a top wall and a bottom wall, edge walls holding said top and bottom walls in spaced parallelism to each other, a chassis member, said chassis member including a principal surface parallel to said bottom wall of which at least a portion is substantially co-extensive therewith, film-supports and film-guides mounted upon said chassis plate and extending from the side thereof opposite that which is adjacent said bottom wall, and cooperating formations upon at least one edge of said chassis plate and at least one edge wall for holding said chassis plate in pre-determined relation to said casing therewithin, said formations upon said chassis plate extending therefrom in a direction generally parallel to the plane of the principal surface thereof and said formations upon said edge walls being adapted to co-act therewith when said chassis plate is placed within said casing.

66. In a film magazine, an outer protective casing having top and bottom walls held in spaced parallelism to each other by edge walls, a chassis plate for insertion within said casing, said chassis plate when disposed within said casing being parallel to and adjacent said bottom wall, formations extending from said chassis plate at the edges thereof at right angles thereto for positioning said chassis plate against movement toward or away from said edge walls, and formations extending from said chassis plate in substantially the plane of its principal surface for engagement with said edge walls for preventing bodily movement of said chassis plate in a direction normal to said bottom plate, said edge walls being formed with cooperating detent surfaces, and film supports and guides disposed upon the side of said chassis plate opposite that which is adjacent said bottom plate.

67. In a film magazine, an outer protective casing, said casing having a top wall and a bottom wall held in spaced parallelism to each other by edge walls, a chassis plate adapted to be disposed within said casing adjacent the bottom thereof, a film gate disposed upon one edge of said chassis plate and extending therefrom in a direction normal thereto, the edge wall of said magazine adjacent said gate having an aperture, film guides and film supports disposed upon said chassis plate and movable therewith for a film which is fed through said gate, a spring disposed adjacent the edge of said chassis plate opposite that upon which said gate is placed which bears against the inside of the edge wall parallel and opposite to said apertured edge wall for impelling said chassis plate and the gate and film-supporting and guiding members toward said aperture, and means disposed in part upon said chassis and in part upon said casing for guiding said movement.

68. In a film magazine for use with a film handling apparatus having a source of power, means for transmitting said power to the magazine, and means for maintaining the magazine in operative relation to the apparatus; a motion-receiving connection accessible from the exterior of said magazine, a take-up spindle within said magazine, means for driving said take-up spindle at a varying speed proportional to the diameter of the mass of film supported thereby, a positive connection between said motion-receiving connection and said driving means, a footage-recording device including indicia visible from without said magazine, and a positive mechanical motion-transmitting connection between said motion-receiving connection and said footage-recording device whereby said footage-recording device is positively driven by the power of said apparatus irrespective of the diameter of the mass of film upon said take-up spindle.

69. In a film magazine for use in a film-handling apparatus having a source of power, an intermittent pull-down being operated by said power, a member for transmitting power from said source to the magazine, and a mount for holding the magazine in operative position within the apparatus; said magazine having an outer protective casing comprising a top wall and a bottom wall held in spaced parallelism to each other by edge walls, a power-receiving member disposed adjacent said bottom wall and in co-operative relation to said motion-transmitting member of said apparatus when the magazine is in position upon the apparatus with said pull-down of the apparatus engaging and advancing the film, one of said edge walls being provided with an opening through which said pull-down engages the film when the magazine is in position upon the apparatus, a take-up spindle, a connection between said power-receiving member and said take-up spindle, said connection including a slip clutch for driving said spindle, a footage-recording device including visible indicia disposed adjacent said top wall, a drive disposed adjacent said top wall for operating said recording device, and a positive motion-transmitting connection between said power-receiving connection and said driving means disposed parallel to said edge walls whereby said device is positively driven by said apparatus in accordance with the film intermittently advanced by said pull-down.

70. In a film magazine for use with a film handling apparatus, said apparatus having a source of power, means for transmitting said power to the magazine, and means for maintaining the magazine in operative relation to said apparatus; an outer protective casing including a top wall and a bottom wall maintained in spaced parallelism to each other by edge walls, a recess being formed in said bottom wall adjacent its junction with at least one of said edge walls, a gear mounted within said recess for revolution upon an axis parallel to said edge walls and disposed and adapted to be driven by said transmitting means when the magazine is maintained in operative relation to the apparatus, a shaft attached to said gear for revolution with said gear, an embossing upon said top wall of said magazine, a window in said embossing, a disk disposed within said embossing adjacent to said window, indicia upon said disk visible through said window, and a gear train from said shaft to said disk whereby said disk is operated positively by the revolution of said gear.

71. In a film magazine, an outer protective casing including a top wall and a bottom wall held in spaced parallelism to each other by edge walls, a recessed plate parallel to and adjacent said bottom wall but slightly spaced therefrom, an opening being formed in said bottom wall giving access to said opening, a main motion-receiving gear disposed within said recess and accessible from the exterior of said magazine, a motion-transmitting member within said recess and surrounding said gear and shaped generally to conform to the inside of said recess and having teeth formed in the portion thereof between the planes of said plate and the bottom wall of said magazine, a connection between said motion-transmitting member and said gear whereby the revolution of said gear drives said member, a take-up support within said magazine, gearing co-acting with said teeth of said member and extending between said plate and said bottom wall to a connection with said take-up support for revolving said take-up support by the revolution of said motion-transmitting member, a shaft extending upwardly from said main gear parallel to said edge walls to a point adjacent said top wall, a footage-recording device having indicia upon the top thereof disposed adjacent said top wall, a window in said top wall through which said indicia may be read, and an operating connection between said shaft and said device.

72. In a film magazine, a footage-recording device having indicia visible from without the magazine, means for supporting and moving a film, means for operating said footage-recording device to show the amount of film which has been moved, and a mount for said device movable between a first position, wherein said device is disposed between a wall of the magazine and an edge of the film and said indicia are visible through a window in said wall, said wall being equipped with such a window, and a second position, wherein said mount clears the edge of the film so that it can readily be serviced.

73. In a film magazine, an outer protective casing having a top wall and a bottom wall held in spaced parallelism by edge walls, means for supporting a film therein, a bridge-like structure, said structure having a body portion disposed between an edge of the film and said top wall of the magazine and adjacent thereto and a supporting portion thereof at right angles to said body portion parallel to the side of the film and an edge wall and therebetween and connected to said bottom wall, a footage-recording dial mounted upon said body portion adjacent said top wall, and means for driving said footage-recording dial in accordance with the movement of the film supported within said magazine.

74. In a film magazine having top and bottom walls supported in spaced parallelism to each other by edge walls, a supporting bridge-like structure having a body portion parallel to and adjacent said top wall, supports adjacent each of two of said edge walls for mounting said body portion so that it extends from the vicinity of one of said edge walls to that of the other thereof, means within the magazine for supporting a film for revolution upon an axis normal to said bottom wall between said surface of said bridge and said bottom wall and between said supports associated with each of said edge walls, means for revolving said support, said body portion being disposed closely adjacent the edge of the film relatively distant from said bottom wall so that it serves as an edge guide, a footage-recording device mounted upon said body portion adjacent said top wall, said device including indicia visible through a window in said top wall, said top wall being formed with such a window, and means for driving said footage-recording device in accordance with the movement of the film within said magazine, the disposition of said bridge and said support being in compact relation to said several walls respectively.

75. In a film magazine having top and bottom walls held in spaced parallelism by edge walls, a support for a delivery mass of a film, a support for a take-up mass of the film, the edges of the film being disposed relatively adjacent said top and bottom walls, means for guiding the film between said masses, a bridging member disposed adjacent said top wall and between said top wall and the top edge of the film, a footage-recording device mounted upon said bridging member adjacent said top wall, said wall being provided with a window through which said device may be viewed, means for supporting said bridging member extending thereto from said bottom member and disposed within the valley between the masses of film upon said delivery and take-up supports respectively, and means for driving said footage-recording device in accordance with the amount of film which has been moved from said delivery mass to said take-up mass.

76. In a film magazine for use with a film handling apparatus having a source of power, an outer protective casing having a top wall and a bottom wall held in spaced parallelism by edge walls, an operable footage-recording device, means within said casing for supporting and guiding a film, a bridge member supported adjacent the said bottom wall of the casing and having one portion extending from a point adjacent the bottom wall and along and disposed parallel to one of said edge walls and another portion parallel to and adjacent said top wall and between said top wall and the adjacent edge of a film within the casing, said recording device being mounted upon said bridge member adjacent said top wall, a revoluble motion-receiving member disposed adjacent said bottom wall, said motion-receiving member being adapted to be driven by the source of power of the film handling apparatus with which it is used, means engaging said footage-recording device for operating it mounted upon said bridge member, and a motion-transmitting connection between said motion-receiving member and said motion-transmitting means for driving said footage-recording device by the revolution of said motion-receiving member.

77. In a film magazine having top and bottom walls held in spaced parallelism by edge walls, a delivery support for a mass of film, a take-up support for a mass of the film, means for guiding the film as it is fed from said delivery support to said take-up support, a bridging structure, said structure including a pintle adjacent and parallel to an edge wall and extending upwardly from said bottom wall, and a supporting plate pivoted upon said pintle and adapted to be placed between the edges of the mass of the film and said top wall, a footage recording device carried by said plate adjacent said top wall, said top wall being provided with a window through which said device may be viewed, said structure being movable between a first position wherein said device is disposed opposite to said window and it is disposed between the edges of the film and said top wall and a second position wherein it clears said top wall so that the film may be serviced, and means for driving said footage recording device in accordance with the amount of film which has been fed from said delivery to said take-up support.

78. In a film magazine for use with a film handling apparatus having a magazine-receiving compartment, a source of power for a magazine disposed within said compartment, and a member for transmitting power from said source to said magazine; said magazine having a top wall and a bottom wall held in spaced parallelism by edge walls, a delivery support for a film, a take-up support for the film, said supports being revoluble upon axes normal to said top and bottom walls, means for guiding the film as it is moved from said delivery support to said take-up support, a footage recording device, and a bridging structure, said bridging structure comprising a movable body or supporting portion disposed parallel to said top wall and between an edge of the film relatively distant from said bottom wall and said top wall, said footage recording device being mounted upon said supporting portion adjacent said top wall, said top wall being equipped with a window whereby said device is visible from the outside of said magazine, a mount for said body portion upon which it is pivotally movable disposed parallel to an edge wall, said mount including a motion-transmitting instrumentality, a motion-receiving connection disposed adjacent the bottom wall of the magazine for cooperation with said power-transmitting member of the apparatus and for driving said instrumentality, a driving connection between said motion-receiving connection and said take-up support whereby said support is driven in accordance with the revolution of said member, and a driving connection between said motion transmitting instrumentality and said footage-recording device, whereby said footage-recording device registers the amount of film rolled upon said take-up support.

79. In a film magazine having a top wall and a bottom wall supported in spaced parallelism by edge walls, means for supporting and guiding a film as it is fed within the magazine, a footage-recording dial for registering the amount of film which is so fed, a bridging structure, said dial being mounted upon said bridging structure for movement relatively thereto and bodily therewith, said bridging structure extending first in a direction parallel to the flat surface of the film and to said edge walls and then across the edges of the film and adjacent said top wall and being movable upon an axis parallel to an edge wall, said dial being mounted upon the portion of said bridging structure adjacent said top wall and being movable therewith to a position beyond the film so that a film which has been exposed or projected can be readily removed from the magazine or a fresh film inserted therein, and means for operating said footage-recording dial in accordance with the amount of film which has been fed.

80. In a film magazine having top and bottom walls held in spaced parallelism by edge walls, a delivery support for a mass of a film, a take-up support for a mass of the film, means for guiding the film as it is fed from said delivery support to said take-up support, a bridging structure, said structure including a pintle adjacent and parallel to an edge wall, a supporting plate pivoted upon said pintle and disposed between the edges of the film relatively distant from said bottom wall and said top wall, a fixed supporting plate disposed adjacent said bottom wall and embodying a guiding slot, a guide pin parallel to said edge walls extending from the end of said supporting plate relatively distant from said pintle to said slot, said guide pin and said pintle being disposed respectively in the valleys between the take-up and delivery masses of the film, and means for driving said footage-recording device in accordance with the amount of film which has been fed from said delivery to said take-up support.

81. A film magazine for use in a film handling apparatus having a magazine-receiving compartment, a source of power, and means for transmitting power from said source to a magazine within said compartment, said magazine including a container having a top wall and a bottom wall held in spaced parallelism by edge walls, a bodily removable chassis plate adapted for disposal relatively adjacent said bottom wall, a delivery support and a take-up support mounted solely upon said chassis plate, means for moving said take-up support to wind film therefrom mounted upon said chassis plate, and a device for recording the footage of the film which has been moved relative to said take-up support mounted upon said chassis plate, all of said elements mounted upon said chassis plate being bodily removable therewith whereby the film after exposure or projection can be removed from said chassis plate while outside of said magazine and a fresh film inserted and said footage recording device can be re-set prior to the re-insertion of said chassis plate within said magazine.

82. A film magazine for use in a film handling apparatus having a magazine-receiving compartment, a source of power, and means for transmitting power from said source to a magazine within said compartment, said magazine including a container having a top wall and a bottom wall held in spaced parallelism by edge walls, a bodily removable chassis plate adapted for disposal relatively adjacent said bottom wall, a delivvery support and a take-up support mounted solely upon said chassis plate, means for moving said take-up support to wind film therefrom mounted upon said chassis plate, an operable device for recording the footage of the film which has been moved relative to said take-up support mounted upon said chassis plate, all of said elements mounted upon said chassis plate being bodily removable therewith whereby the film after exposure or projection can be removed from said chassis plate while outside of said magazine and a fresh film inserted and said footage recording device can be manually re-set prior to the re-insertion of said chassis plate within said magazine, and means for blocking said recording device except for manual re-setting when said chassis plate is not operatively disposed in said container.

83. Apparatus according to claim 82, said blocking means including a lock operatively interconnected with said recording device.

84. In a film handling device, a mounting plate, a support for a delivery mass of a film, a support for a take-up mass of the film, the film being fed from said delivery mass to said take-up mass, said delivery and take-up supports being mounted upon said mounting plate for revolution upon axes normal thereto, a bridging structure mounted upon said mounting plate for movement between a first position, wherein it is disposed adjacent the edge of the film relatively distant from said mounting plate, the film being disposed between it and said mounting plate so that the film can not be removed from said mounting plate in a direction toward said bridging structure when in said first position, and a second position, wherein it clears the film so that the film can be readily removed in said direction from said mounting plate, a footage-recording device mounted upon said bridging structure for movement relatively thereto and bodily therewith, means for moving said take-up support to wind said film thereupon, mechanism for driving said moving means, and a connection between said driving mechanism and said footage-recording device for operating said footage recording device to indicate the amount of film which has been wound up upon said take-up support.

85. In a film handling device, a mounting plate, a support for a delivery mass of a film, a support for a take-up mass of the film, the film being fed from said delivery mass to said take-up mass, said delivery and take-up supports being mounted upon said plate for revolution upon axes normal thereto, a bridge structure mounted upon said plate and movable between a first position, wherein it is disposed adjacent one edge of the film, the film being disposed between it and said mounting plate so that the film can not be removed from said supports in a direction parallel to said axes, and a second position, wherein it clears the film so that the film can be readily removed in said direction from said supports, a footage-recording device mounted upon said bridge structure for movement relatively thereto and bodily therewith, and means operative when said bridge is in said first position for operating said footage-recording device to indicate the amount of film which has been fed.

86. In a film magazine having relatively broad sides connected by narrow sides, a bodily movable chassis plate adapted for disposal within said magazine parallel to and adjacent one of said broad sides, means mounted upon said plate for supporting a mass of a film upon said chassis plate for revolution upon axes normal to its plane, means mounted upon said plate for revolving said film mass, a bridging structure mounted upon said chassis plate and extending therefrom first in a direction parallel to said axis and second in a direction normal thereto and adjacent the edge of the film relatively distant from said chassis plate whereby the removal of the film in a direction parallel to said axis is prevented by said bridging structure, said bridging structure including instrumentalities upon which it is movable from said above defined position to one wherein it is disposed beyond the mass of the film whereby the film can be readily removed in said direction, and operable instrumentalities useful in connection with the movement of the film and operatively connected to said revolving means mounted upon said bridging structure for bodily movement therewith and movement relatively thereto, said instrumentalities being operative when said bridge is in said first above defined position.

87. In a film magazine having a top and a bottom wall held in spaced parallelism to each other by edge walls, a flat chassis plate disposed adjacent said bottom wall and within said magazine, a delivery support for a film and a take-up support for the film disposed upon said chassis plate, means for guiding the film as it is fed from said delivery to said take-up support disposed upon said chassis plate, a bodily movable bridging structure mounted upon said chassis plate, said bridging structure having a first portion journalled upon said chassis plate and extending therefrom in a direction normal thereto which when said chassis plate is disposed in said magazine extends parallel to an edge wall adjacent thereto to a point between the edges of the film relatively distant from said bottom wall and said top wall and a second portion which extends at right angles from said first portion and parallel and adjacent to said top wall, said bridging structure thereby extending first parallel to the sides of the film and then across the edges thereof, between them and said top wall, a footage-recording device mounted upon said second section of said bridging structure adjacent said top wall and carrying indicia visible therethrough, said top wall being provided with a window in line with said indicia, and means for driving said footage-recording device in accordance with the amount of film which has been fed from said delivery to said take-up support, said structure being movable from said above-defined position to one wherein said second portion clears the edges of the film.

88. For use in a film magazine for use with an apparatus which has a magazine receiving compartment, a source of power, and a motion transmitting connection therefrom, said magazine including an outer protective container having a top and a bottom wall held in spaced parallelism to each other by edge walls, a flat chassis plate; said chassis plate being bodily movable between a first position within said magazine adjacent said bottom wall and a second position without said container, said container and said chassis plate having cooperating guiding formations whereby said chassis plate may be readily moved between said first and said second positions; a delivery support and a take-up support; means for guiding a film as it is fed from said delivery to said take-up support; a footage recording device including indicia, a wall of said magazine being provided with a window through which said indicia can be viewed when said chassis plate is disposed in said first position; a motion-receiving connection for engagement with the connection from the source of power of the apparatus when the container is disposed in the magazine compartment thereof, said bottom wall being provided with an opening so that said connection can be engaged by said member when said chassis plate is in said first position; gearing between said motion-receiving connection and said take-up support for driving said take-up support by said member; means for driving said footage-recording device in accordance with the amount of film which has been fed, and means accessible when chassis plate is moved to said second position for re-setting said indicia, the re-insertion of said chassis plate within said magazine not changing said setting; all of said parts being mounted upon said chassis plate for bodily movement therewith whereby when said plate is in said second position a film which has been projected or exposed may be removed and said footage recording device re-set without interference from said container, the reinsertion of said chassis plate by its movement to said first position rendering said device again operative.

89. In a film magazine for use with an apparatus which has a magazine receiving compartment, a source of power and a motion transmitting connection therefor, said magazine including an outer protective container having a top and a bottom wall held in spaced parallelism to each other by edge walls, and a flat chassis plate; said chassis plate being bodily movable between a first position within said magazine adjacent said bottom wall and a second position without said container, said container and said chassis plate having co-operating guiding formations whereby said chassis plate may be readily moved between said first and second positions, a delivery support and a take-up support, guides for directing a film as it is fed from said delivery to said take-up support, a footage recording device, said device having indicia, a wall of said container being provided with a window through which said indicia can be viewed when said chassis plate is disposed in said first position, a motion-receiving connection for engagement with a motion transmitting connection of the apparatus when the container is disposed in the magazine compartment thereof, said bottom wall being provided with an opening so that said connection can be engaged by said member when said chassis plate is in said first position, gearing between said motion-receiving connection and said take-up support for driving said take-up support by said member, means for driving said footage-recording device in accordance with the amount of film which has been fed; said supports, guides, footage recording device, motion receiving connection, gearing and driving means being disposed upon said chassis plate for bodily movement therewith; and means rendered effective when said chassis plate is placed in said second position for pre-determinedly positioning said chassis plate and the parts carried thereby in said compartment independently of minor manufacturing variations in said container; and means accessible when chassis plate is moved to said second position for re-setting said indicia, the re-insertion of said chassis plate within said magazine by its movement to said second position not changing said setting.

90. In a film magazine for use with an apparatus which has a magazine-receiving compartment, a source of power and a motion transmitting connection therefor; said magazine including an outer protective container having a top and a bottom wall held in spaced parallelism to each other by edge walls, and a flat chassis plate; said chassis plate being bodily movable between a first position within said container adjacent said bottom wall and a second position without said container, said container and said chassis plate having co-operating guiding formations whereby said chassis plate may be readily moved between said first and second positions, a delivery support and a take-up support, guides for directing a film as it is fed from said delivery to said take-up support, a motion-receiving connection for engagement with the motion transmitting connection of the apparatus when the container is disposed in the magazine-receiving compartment thereof, said bottom wall being provided with an opening so that said connection can be engaged by said member when said chassis plate is in said first position, gearing between said motion-receiving connection and said take-up support for driving said take-up support by said member, said supports, guides, footage recording device, motion receiving connection, gearing and driving means being disposed upon said chassis plate for bodily movement therewith; and means rendered effective when said chassis plate is placed in said second position for pre-determinedly positioning said chassis plate and the parts carried thereby in said compartment independently of minor manufacturing variations in said container.

WARREN DUNHAM FOSTER.
    OLIVER WHITWELL WILSON.

REFERENCES CITED

The following references are of record in the file of this patent:

UNITED STATES PATENTS

| Number | Name | Date |
|---|---|---|
| 1,716,990 | Thornton | June 11, 1929 |
| 1,954,808 | Foster et al. | Apr. 17, 1934 |
| 1,969,475 | Opperman | Aug. 7, 1934 |
| 2,007,188 | Foster et al. | July 9, 1935 |
| 2,008,988 | Michalyi | July 23, 1935 |
| 2,022,353 | Kindelmann et al. | Nov. 36, 1935 |
| 2,026,984 | Lyman | Jan. 7, 1936 |
| 2,039,697 | Wittel | May 5, 1936 |
| 2,043,914 | Wittel | June 9, 1936 |
| 2,126,341 | Nagel | Aug. 9, 1938 |
| 2,132,714 | Wittel et al. | Oct. 11, 1938 |
| 2,161,341 | Fairbanks | June 6, 1939 |
| 2,216,463 | Steiner | Oct. 1, 1940 |
| 2,216,909 | Foster | Oct. 8, 1940 |
| 2,277,695 | Foster | Mar. 31, 1942 |
| 2,326,654 | Jagust | Aug. 10, 1943 |
| 2,431,254 | Jacobson | Nov. 18, 1947 |